(12) United States Patent
Jeong et al.

(10) Patent No.: US 10,579,870 B2
(45) Date of Patent: Mar. 3, 2020

(54) OPERATING METHOD FOR FUNCTION OF IRIS RECOGNITION AND ELECTRONIC DEVICE SUPPORTING THE SAME

(71) Applicant: Samsung Electronics Co., Ltd., Suwon-si, Gyeonggi-do (KR)

(72) Inventors: Su Ryong Jeong, Yongin-si (KR); Kyung Bae Park, Seoul (KR); Woon Tahk Sung, Seoul (KR); Yeong Seong Yoon, Seoul (KR); Tae Hwa Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/819,430

(22) Filed: Nov. 21, 2017

(65) Prior Publication Data
US 2018/0173949 A1 Jun. 21, 2018

(30) Foreign Application Priority Data
Dec. 20, 2016 (KR) .......................... 10-2016-0174371

(51) Int. Cl.
*G06K 9/00* (2006.01)
*H04N 5/33* (2006.01)

(52) U.S. Cl.
CPC ....... *G06K 9/00604* (2013.01); *G06K 9/0061* (2013.01); *H04N 5/33* (2013.01)

(58) Field of Classification Search
CPC ............. G06K 9/00604; G06K 9/0061; G06K 9/00597; H04N 5/33; G06F 21/32; H04L 29/06809
See application file for complete search history.

(56) References Cited

U.S. PATENT DOCUMENTS 5,818,954 A * 10/1998 Tomono .................. G06F 3/013
382/115
7,231,069 B2 * 6/2007 Nahata ............... G06K 9/00597
382/117
(Continued)

FOREIGN PATENT DOCUMENTS

EP 1471455 A2 10/2004
EP 2983107 A2 2/2016

OTHER PUBLICATIONS

Extended European Search Report dated Sep. 30, 2019, issued in a counterpart European application No. 17885329.7-1207 | 3529748.

*Primary Examiner* — Manav Seth
(74) *Attorney, Agent, or Firm* — Jefferson IP Law, LLP

(57) ABSTRACT

A method of operating an iris recognition function, and an electronic device thereof are provided. The electronic device includes a first camera device, a second camera device, and at least one processor operatively connected to the first camera device and the second camera device. The at least one processor is configured to, if an execution of an iris recognition function is requested, obtain a first image associated with a subject, based on the first camera device, and output information about a feature point of the obtained first image on a display, and if the information about the feature point satisfies a specified condition, obtain a second image associated with the subject based on the second camera device, and wherein a display location of the information about the feature point on the display is changed depending on a capture angle between the subject and the first camera device.

20 Claims, 13 Drawing Sheets

(56) References Cited

U.S. PATENT DOCUMENTS

| | | | |
|---|---|---|---|
| 7,574,021 B2 * | 8/2009 | Matey | G06K 9/00604 |
| | | | 382/115 |
| 7,835,568 B2 | 11/2010 | Park et al. | |
| 8,064,647 B2 * | 11/2011 | Bazakos | G06K 9/00261 |
| | | | 382/117 |
| 8,334,907 B2 * | 12/2012 | Kim | H04N 5/23219 |
| | | | 348/169 |
| 8,761,458 B2 * | 6/2014 | Bazakos | G06K 9/00261 |
| | | | 382/117 |
| 9,213,895 B2 * | 12/2015 | Min | G06K 9/00604 |
| 9,311,527 B1 * | 4/2016 | Yin | G06F 3/00 |
| 9,366,843 B2 | 6/2016 | Prabhakar et al. | |
| 9,442,273 B2 | 9/2016 | Prabhakar et al. | |
| 9,532,714 B2 * | 1/2017 | Border | A61B 5/1171 |
| 9,602,872 B2 * | 3/2017 | Park | G06F 3/011 |
| 9,613,286 B2 * | 4/2017 | Son | G06K 9/46 |
| 9,767,358 B2 * | 9/2017 | Xue | H04N 5/23219 |
| 10,148,940 B2 * | 12/2018 | Rouh | A61B 5/0062 |
| 10,204,266 B2 * | 2/2019 | Lee | G06K 9/00604 |
| 10,205,883 B2 * | 2/2019 | Kobayashi | H04N 5/23293 |
| 10,254,831 B2 * | 4/2019 | Kempinski | G06F 3/013 |
| 10,339,367 B2 * | 7/2019 | Eder | G06K 9/00288 |
| 2004/0202353 A1 * | 10/2004 | Doi | G06K 9/00604 |
| | | | 382/115 |
| 2004/0207743 A1 | 10/2004 | Nozaki et al. | |
| 2005/0063582 A1 | 3/2005 | Park et al. | |
| 2005/0270386 A1 | 12/2005 | Saitoh et al. | |
| 2006/0147094 A1 | 7/2006 | Yoo | |
| 2007/0183633 A1 | 8/2007 | Hoffmann | |
| 2010/0299530 A1 * | 11/2010 | Bell | G06F 21/32 |
| | | | 713/186 |
| 2012/0293629 A1 * | 11/2012 | Min | G06K 9/00604 |
| | | | 348/46 |
| 2013/0089240 A1 * | 4/2013 | Northcott | G06K 9/00604 |
| | | | 382/117 |
| 2013/0329029 A1 | 12/2013 | Nozaki et al. | |
| 2014/0016871 A1 * | 1/2014 | Son | G06K 9/46 |
| | | | 382/201 |
| 2014/0218497 A1 | 8/2014 | Hanna et al. | |
| 2015/0243063 A1 * | 8/2015 | Yoon | G06F 21/6245 |
| | | | 345/634 |
| 2015/0362700 A1 | 12/2015 | Prabhakar et al. | |
| 2016/0012218 A1 * | 1/2016 | Perna | G06F 16/5838 |
| | | | 726/18 |
| 2016/0034759 A1 | 2/2016 | Jung | |
| 2016/0092720 A1 | 3/2016 | Lee et al. | |
| 2016/0094833 A1 | 3/2016 | Rouh et al. | |
| 2016/0134791 A1 | 5/2016 | Prabhakar et al. | |
| 2016/0148048 A1 | 5/2016 | Prabhakar et al. | |
| 2017/0061210 A1 * | 3/2017 | Ollila | G06K 9/00604 |
| 2019/0171877 A1 | 6/2019 | Lee et al. | |

\* cited by examiner

OPERATING METHOD FOR FUNCTION OF IRIS RECOGNITION AND ELECTRONIC DEVICE SUPPORTING THE SAME

CROSS-REFERENCE TO RELATED APPLICATION(S)

This application claims the benefit under 35 U.S.C. § 119(a) of a Korean patent application filed on Dec. 20, 2016 in the Korean Intellectual Property Office and assigned Serial number 10-2016-0174371, the entire disclosure of which is hereby incorporated by reference.

TECHNICAL FIELD

The present disclosure relates to an iris recognition function.

BACKGROUND

Nowadays, various types of portable electronic devices such as a smartphone, a tablet personal computer (PC), and the like have been widely distributed. The portable electronic devices support the iris recognition function with regard to a security function.

The above information is presented as background information only to assist with an understanding of the present disclosure. No determination has been made, and no assertion is made, as to whether any of the above might be applicable as prior art with regard to the present disclosure.

SUMMARY

In the case of an iris recognition function, if iris recognition is requested, an electronic device may activate an infra-red (IR) camera device to obtain a user's iris image and may determine whether the obtained iris image is the same as the stored information. The electronic device analyzes an image obtained by using the IR camera device to determine whether the size of the user's iris becomes a specific size at a predefined specific point. At this time, an operation of detecting an iris area by using the IR camera device, the capture angle of which is relatively narrow, has many errors and needs relatively a lot of operating time to detect an iris area based on the obtained IR image. As such, the iris recognition function of an electronic device needs a lot of time to analyze an image, and the accuracy thereof is relatively low according to the related art.

Aspects of the present disclosure are to address at least the above-mentioned problems and/or disadvantages and to provide at least the advantages described below. Accordingly, an aspect of the present disclosure is to provide an iris recognition function operating method capable of saving the power of an electronic device or improving an iris recognition speed, and an electronic device supporting the same.

In accordance with an aspect of the present disclosure, an electronic device is provided. The electronic device may include a first camera device, a second camera device and at least one processor operatively connected to the first camera device and the second camera device, wherein the at least one processor is configured to, if an execution of an iris recognition function is requested, obtain a first image associated with a subject, based on the first camera device, and output information about a feature point of the obtained first image in a display, and if the information about the feature point satisfies a specified condition, obtain a second image associated with the subject based on the second camera device, and wherein a display location of the information about the feature point is changed depending on a capture angle between the subject and the first camera device.

In accordance with another aspect of the present disclosure, a method for operating an iris recognition function is provided. The method may include receiving a request for execution of an iris recognition function, obtaining a first image of a subject based on a first camera device, outputting information about a feature point of the obtained first image in a display and if the information of the feature point satisfies a specified condition, obtain a second image associated with the subject based on a second camera device different from the first camera device, wherein a display location of the information about the feature point is changed depending on a capture angle between the subject and the first camera device.

As described above, various embodiments may make it possible to improve the iris recognition speed of an electronic device and to operate the iris recognition function, which reduces the power consumption of the electronic device associated with the iris recognition function.

In addition, according to various embodiments, the flicker caused by the light emitter that emits light of a specified frequency band is minimized, thereby reducing the user inconvenience due to the flickering.

Furthermore, various embodiments may make it possible to generate or provide various user interfaces (UIs) suitable for user's preference, based on a face feature point.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
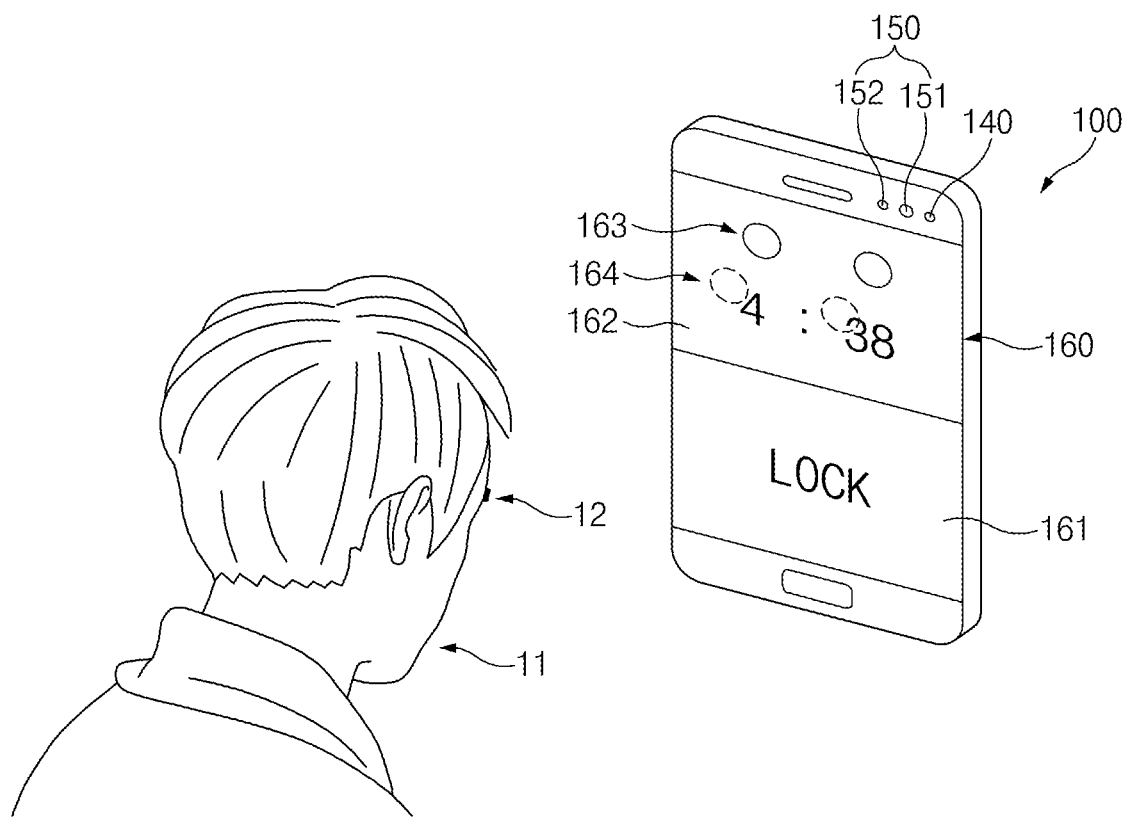
FIG. 1 is a drawing illustrating an example of an iris recognition environment, according to an embodiment of the present disclosure.

The following description with reference to accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element(s) (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. A central processing unit (CPU), for example, a "processor configured to perform A, B, and C" may mean a dedicated processor (e.g., an embedded processor) for performing a corresponding operation or a generic-purpose processor (e.g., a CPU or an application processor (AP)) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) audio layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the photographing apparatus may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e.g., an artificial intelligence electronic device) that uses an electronic device.

FIG. 1 is a drawing illustrating an example of an iris recognition environment, according to an embodiment of the present disclosure.

Referring to FIG. 1, the iris recognition environment according to an embodiment of the present disclosure may obtain an image, which corresponds to at least part of a user's face 11 including an eye area 12, by using a first camera device of an electronic device 100, for example, a red, green, blue (RGB) camera device 140. If the obtained first image (e.g., an RGB image) satisfies a specified condition, the iris recognition environment may obtain a second image, which is associated with the eye area 12, for example, an infra-red (IR) image based on a second camera device thereof, for example, an IR camera device 150 (e.g., an IR camera 151 and a light emitting unit (e.g. light emitter), which emits light of a specified frequency band associated with an image capture of the second camera device, for example, an IR light emitting unit 152), for the purpose of executing an iris recognition function. With the above description, the iris recognition environment according to an embodiment of the present disclosure may analyze an image for iris area detection and may track an iris area, by using the RGB camera device 140 that operates at low power of a specified reference value or less and has the high accuracy of feature point detection compared with the IR camera device 150. In addition, the iris recognition environment according to an embodiment of the present disclosure may provide a high response speed, by analyzing and tracking an iris area based on the RGB camera device 140 that has a processing speed higher than the IR camera device 150. Furthermore, the iris recognition environment according to an embodiment of the present disclosure may analyze various feature points included in a face by using the RGB camera device 140 to apply various replaceable images to the iris recognition function based on the analyzed result.

According to an embodiment, in the iris recognition environment, the electronic device 100 may provide a menu or an icon associated with the execution of the iris recognition function. Alternatively, the electronic device 100 may provide a voice recognition function associated with the execution of the iris recognition function and may extract an instruction associated with the execution of the iris recognition function from the collected voice. Alternatively, when executing a specified application (e.g., a lock screen unlocking-related application, a financial function executing-related application, or an application to which a security-related function such as information about privacy, the execution of a function to search for a file, or the like is at least partly applied) or the like, the electronic device 100 may execute the iris recognition function.

If the execution of the iris recognition function is requested, the electronic device 100 may activate the RGB camera device 140 to obtain an RGB image (e.g., an RGB preview image or an RGB capture image). According to an embodiment, the electronic device 100 may analyze the obtained RGB preview image to extract at least one feature point. The electronic device 100 may determine whether the obtained RGB preview image is the person's face (or human's face) 11, based on the extracted feature points. If it is determined that the obtained RGB preview image is the human's face 11, the electronic device 100 may extract feature points of the eye area 12 from the RGB preview image. If the feature points corresponding to the eye area 12 are extracted, the electronic device 100 may output guide information such that an eye area in the image is located at a specified location on a display 160. In this regard, the electronic device 100 may output an indicator 164 that indicates the eye area 12 detected based on the RGB preview image and a target location object 163 at which the indicator 164 needs to be located, to the area of the display 160. According to various embodiments, the electronic device 100 may output an application information area associated with iris recognition to a first area 161 of an iris user interface (UI). The indicator 164 and the target location object 163 may be output to a second area 162 of the iris UI provided with regard to the execution of the iris recognition function.

In the case where the indicator 164 corresponding to the eye area 12 is disposed at a specified point (e.g., a point within a specific distance from the target location object 163 on the screen of a display), the electronic device 100 may activate the IR camera device 150 to perform the iris recognition. In this operation, the electronic device 100 may extract an iris feature point from an IR image (e.g., an IR preview image or an IR still image corresponding to an iris image) obtained by the IR camera device 150 and may compare the extracted iris feature point with information stored in a memory to process an iris recognition operation. If the iris recognition is successful, the electronic device 100 may execute a specified function.

Figure 2:
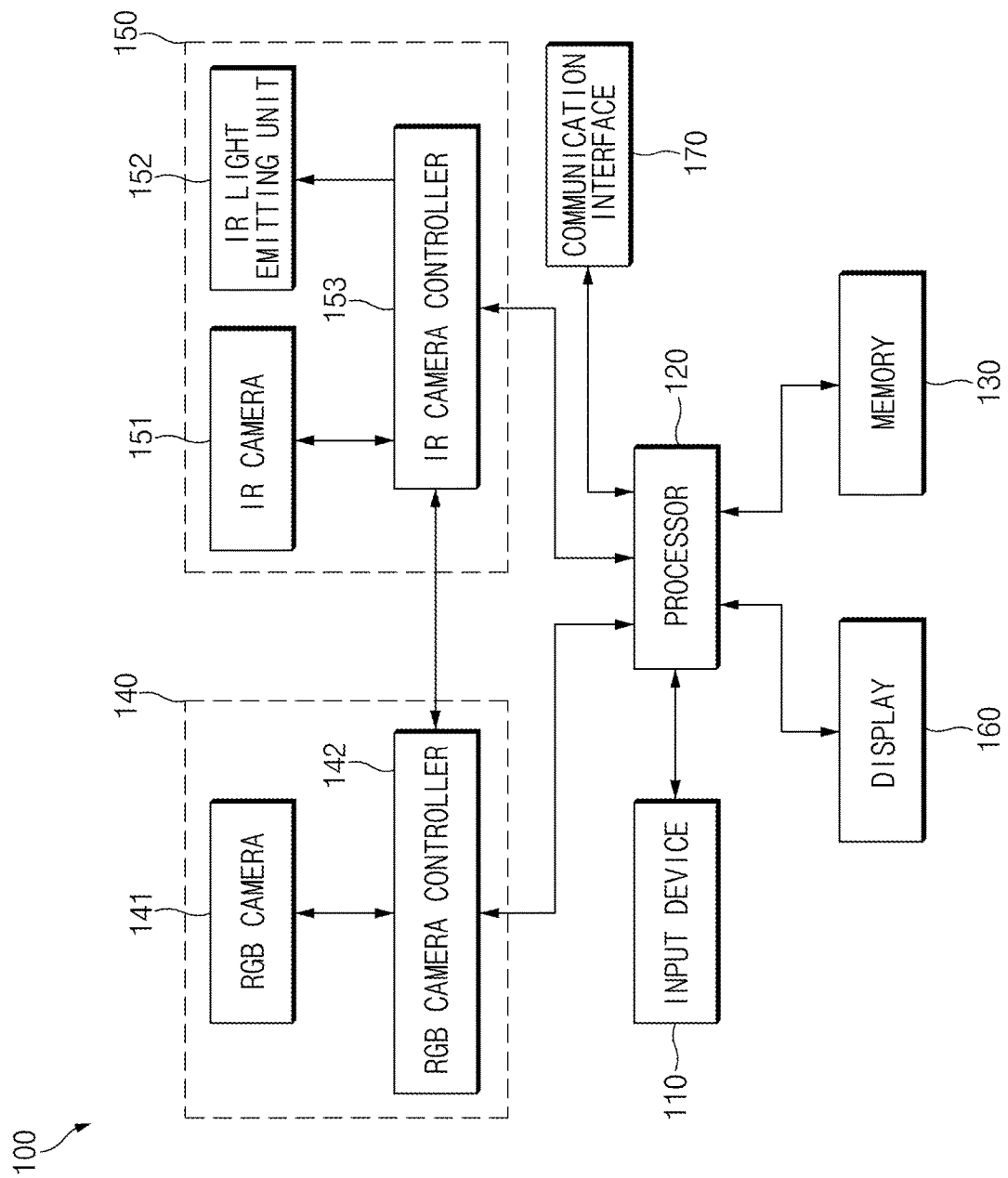
FIG. 2 is a block diagram illustrating an example of a configuration of an electronic device, according to an embodiment of the present disclosure.

FIG. 2 is a block diagram illustrating an example of a configuration of an electronic device, according to an embodiment of the present disclosure.

Referring to FIG. 2, the electronic device 100 according to an embodiment of the present disclosure may include an input device 110, a processor 120, a memory 130, the RGB camera device 140, and the IR camera device 150 and may further include the display 160 or the like. Additionally, the electronic device 100 may further include a communication circuit, a sensor, and the like.

According to various embodiments of the present disclosure, the input device 110 may include at least one means or at least one user interface (UI) capable of generating an input signal corresponding to a user input. According to an embodiment, the input device 110 may include a physical button associated with the execution of an iris recognition function. According to various embodiments, the input device 110 may include a touch key or a touch screen display panel, which is associated with the execution of the iris recognition function. In this case, the input device 110 may include the display 160 in which an icon associated with the execution of the iris recognition function is displayed.

According to various embodiments of the present disclosure, the memory 130 may store at least one application program associated with the operation of the electronic device 100. According to an embodiment, the memory 130 may include a camera application program associated with the operations of the RGB camera device 140 and the IR camera device 150. For example, the camera application program may include an instruction set for activating the RGB camera device 140 when the execution of the iris recognition function is requested, an instruction set for analyzing an RGB preview image or an RGB still image, which the RGB camera device 140 obtains, to detect a face and an eye area, and an instruction set for outputting a specified UI based on the detected information. In addition, the camera application program may include an instruction set for activating the IR camera device 150 depending on the matching result between the detected information and the specified UI, and an instruction set for processing the iris recognition function based on the IR preview image or the IR still image that the is obtained by the IR camera device 150.

According to various embodiments of the present disclosure, the RGB camera device 140 may include an RGB camera 141 and an RGB camera controller 142. The RGB camera 141 may be disposed such that a lens is exposed to one side of the case of the electronic device 100. The RGB camera 141 may be disposed on the same surface as a surface on which the IR camera 151 and the IR light emitting unit 152 are disposed. According to an embodiment, the RGB camera 141 may be disposed on one side of the front surface (e.g., one side of an upper end) of the electronic device 100 in which the display 160 is disposed. The RGB camera 141 may be activated or deactivated, in response to a control signal from the RGB camera controller 142. If the RGB camera 141 is activated with regard to the iris recognition function, the RGB camera 141 may obtain the RGB preview image to transmit the obtained RGB preview image to the RGB camera controller 142 or the processor 120. The RGB preview image obtained by the RGB camera 141 may be output to the display 160.

According to various embodiments of the present disclosure, the RGB camera controller 142 may provide a control signal associated with the driving of the RGB camera 141. Furthermore, the RGB camera controller 142 may process a preview image obtained by the RGB camera 141. For example, the RGB camera controller 142 may be implemented with at least part of the processor 120. Alternatively, the RGB camera controller 142 may be provided as a separate processor, not being included in the RGB camera device 140. In this case, the RGB camera controller 142 may control the RGB camera 141 based on a separate communication channel connected to the RGB camera 141 or may control the RGB camera 141 through the processor 120 connected to the RGB camera 141. If the execution of the iris recognition function is requested (e.g., a request for the execution of the iris recognition function is received from the processor 120 or the input device 110), the RGB camera controller 142 may activate the RGB camera 141. In this operation, the RGB camera controller 142 may request an IR camera controller 153 to activate the IR camera 151. The RGB camera 141 and the IR camera 151 may be activated at the same time.

According to various embodiments of the present disclosure, the RGB camera controller 142 may analyze the RGB preview image obtained by the RGB camera 141 to extract a face feature point or an eye area feature point. The RGB camera controller 142 may output the specified UI based on the extracted face feature point or eye area feature point. At least part of the specified UI may be stored in the memory 130 in advance. According to an embodiment, the specified UI may be generated based on a specific photo image designated by a user, a photo image received from an external server, a specific animation character image, or the like. If the extracted face feature point or eye area feature point (hereinafter, it is described based on an eye area feature point) is disposed at a specified location on a screen (e.g., a capture angle is changed or a subject moves, such that a specified feature point is disposed at a specific location of the display 160), the RGB camera controller 142 may transmit a control signal associated with the activation of the IR camera device 150 to the IR camera device 150. According to various embodiments, if a specified condition (e.g., a condition that the indicator 164 corresponding to the eye area 12 is located at a specified point on a screen area of the display 160) associated with the eye area feature point is satisfied, the RGB camera controller 142 may request the IR camera controller 153 to activate the IR light emitting unit 152 and to execute the iris recognition function.

According to various embodiments of the present disclosure, the IR camera device 150 may include the IR camera 151, the IR light emitting unit 152, and the IR camera controller 153. The IR camera 151 may obtain an IR image associated with an iris based on the light emitted by the IR light emitting unit 152 and may transmit the obtained IR image to the IR camera controller 153 or the processor 120. In this operation, the IR camera 151 may obtain an IR preview image (e.g., the preview image obtained based on Infrared wavelength) associated with, for example, the iris-related eye area of a user, under control of the IR camera controller 153. Alternatively, under control of the IR camera controller 153, the IR camera 151 may determine whether the iris area is obtained more than a specified size from the IR preview image and may obtain an IR still image associated with an iris if the iris area is obtained more than the specified size.

The IR light emitting unit 152 may emit light of a specified wavelength, under control of either the RGB camera controller 142 or the IR camera controller 153. For example, in the case where the preview image obtained by the RGB camera 141 satisfies the specified condition, the IR light emitting unit 152 may emit the light under control of the RGB camera controller 142 (or under control of the IR camera controller 153).

According to various embodiments of the present disclosure, the IR camera controller 153 may control a point in time when the IR light emitting unit 152 emits the light and the acquisition of the IR image (e.g., the IR preview image or the IR still image) of the IR camera 151 or may control the acquisition of the IR preview image or the IR still image (the still image obtained based on the infrared wavelength). According to an embodiment, if a request for the execution of iris recognition is received from the RGB camera controller 142, the IR camera controller 153 may activate the IR light emitting unit 152 and may control the IR light emitting unit 152 to emit light of a specified wavelength band. In addition, the IR camera controller 153 may obtain the IR preview image or the IR still image based on the IR camera 151 to analyze the obtained IR preview image or IR still image.

According to various embodiments of the present disclosure, for example, if the execution of the iris recognition function is requested by the RGB camera controller 142, the IR camera controller 153 may activate the IR light emitting unit 152 and may obtain an IR still image that is based on the IR camera 151. Alternatively, the IR camera controller 153 may determine an iris size based on the IR preview image obtained by the IR camera 151. In the case where the iris size is not less than a specified size, the IR camera controller 153 may process the iris recognition function based on the corresponding IR preview image. Alternatively, if the IR preview image in which the iris size is not less than the specified size is obtained, the IR camera controller 153 may obtain the IR still image and may analyze an iris image included in the obtained IR still image.

According to various embodiments of the present disclosure, the IR camera controller 153 may compare and analyze the iris image pre-stored in the memory 130 with the currently obtained iris image. For example, the IR camera controller 153 may compare and analyze an iris image-related feature point pre-stored in the memory 130 or model information provided by using an iris feature point with an iris image-related feature point currently obtained or model information generated by using a feature point. In the case where the comparison result indicates that a similarity rate (the identity between the pre-stored information with the currently obtained information) is not less than a specified reference value, the IR camera controller 153 may process iris recognition success and may transmit the processing result to the processor 120.

According to various embodiments, the IR camera controller 153 may be implemented with at least part of the processor 120 or may be implemented with another processor independently of the processor 120. As such, the IR camera controller 153 may control the activation of the IR light emitting unit 152 and the IR camera 151, and processing (e.g., the acquisition of the IR preview image or the acquisition of the IR still image, the analysis of an iris image, or the like) associated with iris recognition that is based on the IR camera 151 may be performed by the processor 120. If receiving information about the iris recognition success from the IR camera controller 153, the processor 120 may execute a specified function (e.g., unlock a lock screen, execute a function of a gallery or a finance payment, to which security is set).

According to various embodiments of the present disclosure, the display 160 may output at least one screen associated with the operation of the electronic device 100. For example, the display 160 may output a lock screen or the like in response to a user input. Alternatively, the display 160 may output a screen for requesting the execution of an application, to which security is set. To unlock a screen, to which security is set, or to execute a function, to which security is set, the display 160 may output a screen associated with the processing of the iris recognition function. For example, the display 160 may output at least part of a preview image and the specified UI with regard to the processing of the iris recognition function. The display 160 may output the IR preview image or the IR still image, which the IR camera 151 obtains. The display 160 may output a message associated with iris recognition failure or iris recognition success. When the iris recognition is successful, the display 160 may output the execution screen of a specified function under control of the processor 120.

According to various embodiments of the present disclosure, the processor 120 may transmit and process a signal associated with the function control of the electronic device 100. According to an embodiment, the processor 120 may control the activation of the RGB camera 141 and the activation of the IR camera 151 and the IR light emitting unit 152 to execute the iris recognition function based on the activated cameras, in response to a request for the execution of the iris recognition function. In this regard, the processor 120 may include a configuration illustrated in FIG. 3.

Figure 3:
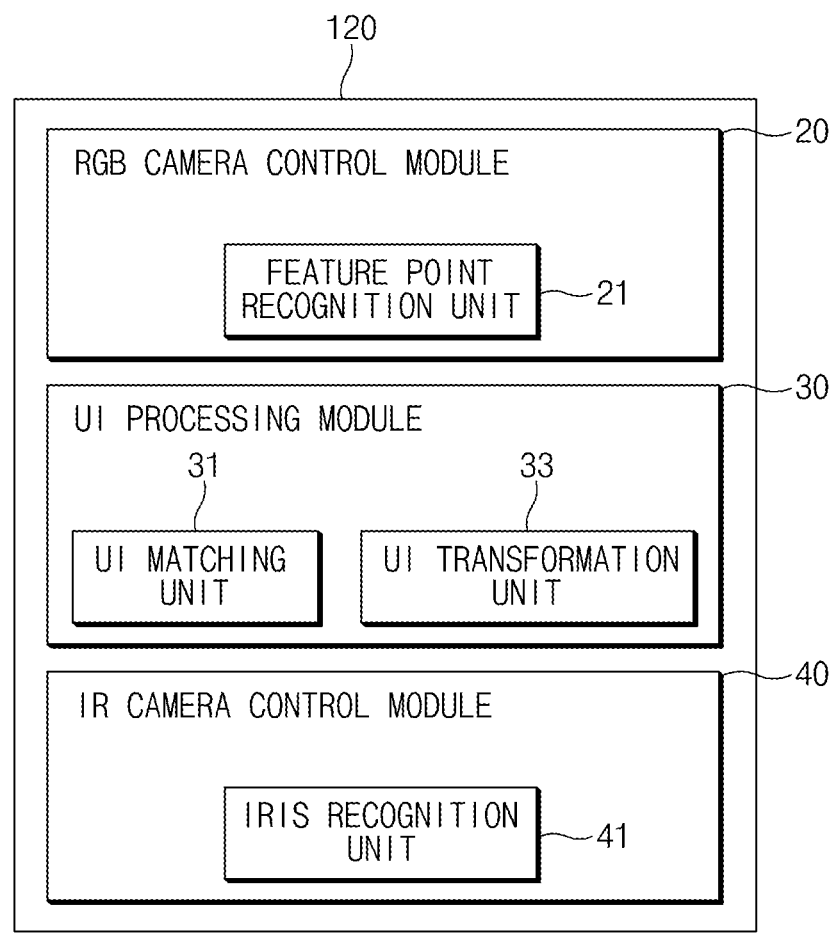
FIG. 3 is a view illustrating an example of a configuration of a processor, according to an embodiment of the present disclosure.

FIG. 3 is a view illustrating an example of a configuration of a processor, according to an embodiment of the present disclosure.

Referring to FIG. 3, the processor 120 according to an embodiment of the present disclosure may include an RGB camera control module 20, a UI processing module 30, and an IR camera control module 40. At least part of the above-described at least one or more modules may be implemented with at least one or more hardware processors. Alternatively, the at least one or more modules may be loaded on the memory 130 and may include at least one instruction set executed by the processor 120.

According to various embodiments of the present disclosure, the RGB camera control module 20 may process a signal associated with the operation of the RGB camera 141. For example, the RGB camera control module 20 may transmit the signal associated with the operation of the RGB camera 141 to the RGB camera controller 142. Alternatively, at least part of the RGB camera control module 20 may correspond to the above-described RGB camera controller 142. In this case, the RGB camera control module 20 may directly control the RGB camera 141. If the execution of the iris recognition function is requested, the RGB camera control module 20 may activate the RGB camera 141 and may obtain an RGB preview image. The RGB camera control module 20 may extract and analyze a feature point associated with the obtained RGB preview image. In this regard, the RGB camera control module 20 may include a feature point recognition unit 21.

According to various embodiments of the present disclosure, the feature point recognition unit 21 may extract the feature point associated with the obtained RGB preview image. The feature point recognition unit 21 may determine whether the extracted feature points are matched to specified feature points (e.g., feature points corresponding to a human's face). If it is determined that the extracted feature points are face feature points, the feature point recognition unit 21 may extract feature points corresponding to an eye area. The feature point recognition unit 21 may transmit information about the extracted feature points to the UI processing module 30.

According to various embodiments of the present disclosure, the UI processing module 30 may output a specified UI based on the information about the feature points received from the feature point recognition unit 21. In addition, the UI processing module 30 may determine whether locations of the feature points are located at specified locations of the output UI. In this regard, the UI processing module 30 may include a UI transformation unit 33 and a UI matching unit 31.

According to various embodiments of the present disclosure, the UI transformation unit 33 may output a specific image, depending on settings or based on the locations of the feature points. For example, the UI transformation unit 33 may collect an image (e.g., an image of a specific face photo, a character, or the like that is stored in advance), which includes an eye and which is pre-stored in the memory 130. The UI transformation unit 33 may change the collected image based on the feature points. For example, the UI transformation unit 33 may change the size or display direction, the display location, or the like of the collected image so as to correspond to the distribution of the feature points. In the case where there is no separate setting (e.g., there is no image collection setting stored in the memory 130), the UI transformation unit 33 may output a user's face, which is being currently captured, to a specific location of the display 160. Alternatively, the UI transformation unit 33 may transform an RGB preview image-based UI (e.g., a screen displayed in the whole area of the display 160) to an IR image-based iris UI (e.g., a screen including an application information area and a matching area of the indicator 164 corresponding to the eye area). In this regard, the UI transformation unit 33 may calculate relative coordinates between the indicator 164 and the target location object 163 (e.g., change a scale for displaying the indicator 164 and the target location object 163 displayed in the whole area of a display, in a partial area of the iris UI). In this operation, the UI transformation unit 33 may obtain application information (e.g., an image associated with the execution of an application, or the like) associated with the iris recognition and may output an application information area to the partial area of the display 160.

According to various embodiments of the present disclosure, the UI matching unit 31 may display the image (e.g., a specified image or a character image) received from the UI transformation unit 33 or the changed image (e.g., an iris UI screen) at a specific location of the display 160. The UI matching unit 31 may output the indicator 164 corresponding to feature points received from the feature point recognition unit 21, to a specific area of the display 160. Alternatively, the UI matching unit 31 may output the target location object 163, at which the indicator 164 needs to be located, to the display 160. The user may move an electronic device (or the capture direction of the RGB camera 141) or may move, such that the indicator 164 overlaps the target location object 163. If the electronic device 100 or a subject moves, the capture direction of the RGB camera 141 capturing the user may be changed, and thus, the location of the indicator 164 corresponding to the image of the user's eye area displayed on the display 160 may be changed. If the indicator 164 at least partly overlaps the target location object 163, the UI matching unit 31 may transmit a specified control signal (e.g., a signal for requesting iris recognition) to the IR camera control module 40.

According to various embodiments of the present disclosure, the IR camera control module 40 may process a signal associated with the operation of the IR camera device 150. At least part of the IR camera control module 40 may correspond to the above-described IR camera controller 153. If receiving a control signal associated with the iris recognition from the UI matching unit 31, the IR camera control module 40 may activate the IR light emitting unit 152 and may control the IR light emitting unit 152 such that the light of a specified wavelength band is emitted. According to various embodiments, the IR light emitting unit 152 may be activated by the RGB camera control module 20. In this case, the IR camera control module 40 may activate the IR camera 151 and may obtain an IR preview image or an IR still image associated with a subject. The IR camera control module 40 may perform iris recognition on an iris area in the obtained IR preview image or IR still image. In this regard, the IR camera control module 40 may include an iris recognition unit 41.

According to various embodiments of the present disclosure, the iris recognition unit 41 may verify an eye area from the obtained IR preview image or IR still image and may obtain an iris image from the eye area. The iris recognition unit 41 may extract a feature point associated with the obtained iris image and may compare the extracted feature point with a feature point included in reference information pre-stored in the memory 130. In this operation, the iris recognition unit 41 may compare the currently extracted feature point with feature points included in the reference information stored in the memory 130. Alternatively, the iris recognition unit 41 may perform modeling based on the extracted feature points and may compare the modeling result with a reference model included in the reference information. The iris recognition unit 41 may determine iris recognition failure or iris recognition success, depending on the comparison result between currently collected information (e.g., feature points which is currently collected or modeling information) with reference information. In the case where the iris recognition fails, the iris recognition unit 41 may output a message corresponding to the iris recognition failure (e.g., output at least one of audio information and video information that indicate the iris recognition failure). In the case where the iris recognition is successful, the iris recognition unit 41 may process the execution of a specified function. For example, the iris recognition unit 41 may execute an application (e.g., an application to which security is set, such as a financial application, a lock screen application, or the like) that requests the execution of the iris recognition function.

According to various embodiments of the present disclosure, an electronic device may include a first camera device (e.g., RGB camera device), a second camera device (e.g., IR camera device), and a processor operatively connected to the first camera device and the second camera device, wherein the processor is configured to, if an execution of an iris recognition function is requested, obtain a first image (e.g., RGB image) associated with a subject, based on the first camera device, and outputting information about a feature point of the obtained first image in a display, if the information about the feature point satisfies a specified condition, obtain a second image (e.g., IR image) associated with the subject based on the second camera device, wherein a display location of the information about the feature point is changed depending on a capture angle between the subject and the first camera device.

According to various embodiments, the processor may be configured to determine whether the subject is a human's face in the first image, if the subject is the human's face, extract a feature point of the human's face or extract a feature point of an eye area included in the human's face, and determine whether information associated with the extracted feature point of the human's face or the extracted feature point of the eye area satisfies the specified condition.

According to various embodiments, the processor may be configured to determine whether the feature point is adjacent to a specified location of the display or at least portion of the feature point overlaps the specified location.

According to various embodiments, the processor may be configured to output at least one of an indicator object corresponding to the feature point or a target location object, at which the indicator object needs to be located, on the display.

According to various embodiments, the processor may be configured to if at least portion of the indicator object overlaps the target location object, obtain the second image based on the second camera device.

According to various embodiments, the processor may be configured to activate the first camera device and the second camera device before obtaining the first image corresponding to a request of the execution of the iris recognition function.

According to various embodiments, the processor may be configured to if the specified condition is satisfied, activate a light emitting unit configured to emit light of a frequency band associated with image capture of the second camera device.

According to various embodiments, the processor may be configured to deactivate a second camera and a light emitting unit associated with the second camera, which are included in the second camera device, during the first camera device is activated, and if the specified condition is satisfied, activate the light emitting unit and the second camera.

According to various embodiments, the processor may be configured to detect an eye area of the subject, and map and output a feature point corresponding to the eye area to eye area information of an image stored in a memory.

According to various embodiments, the processor may be configured to adjust at least one of a display size, a display location, or a display direction of the image in response to a change in a size or a location of the feature point corresponding to the eye area.

Figure 4:
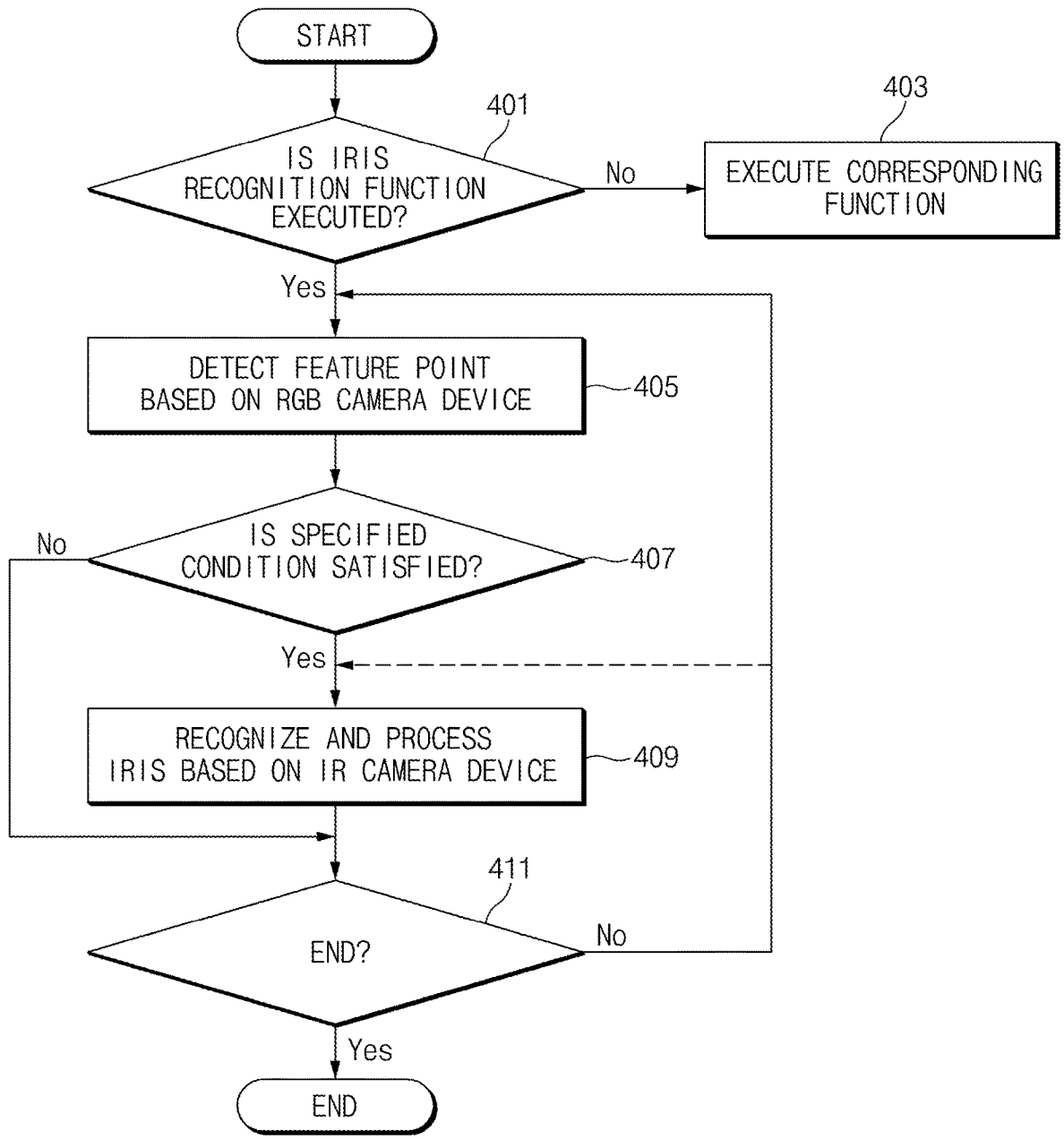
FIG. 4 is a flowchart illustrating an example of an iris recognition function operating method, according to an embodiment of the present disclosure.

FIG. 4 is a flowchart illustrating an example of an iris recognition function operating method, according to an embodiment of the present disclosure.

Referring to FIG. 4, with regard to the iris recognition function operating method, in operation 401, if any event occurs, the processor 120 of the electronic device 100 may determine whether an event associated with the execution of the iris recognition function occurs. For example, if the execution of an application, to which security is set, from among at least one or more applications stored in the memory 130 of the electronic device 100 is requested, the processor 120 may determine that the event associated with the execution of the iris recognition function occurs. According to an embodiment, if a lock screen is output to the display 160, the processor 120 may determine that the event for requesting the execution of the iris recognition function occurs.

If the occurring event is not the event associated with the execution of the iris recognition function, in operation 403, the processor 120 may execute a specified function according to a type of the corresponding event. For example, the processor 120 may execute a call function, a photo capture function, a web surfing function, or the like depending on the type of an event.

If the event associated with the execution of the iris recognition function occurs, in operation 405, the processor 120 (e.g., the RGB camera control module 20) may detect a feature point based on the RGB camera device 140. According to an embodiment, for example, the processor 120 may analyze an RGB preview image obtained based on the RGB camera device 140 and may determine whether feature points associated with a human's face are detected. If the feature points associated with the human's face are detected, the processor 120 may detect feature points corresponding to an eye area in a face area. While performing the operation, the processor 120 may output a specified UI on the display 160 based on the obtained RGB preview image. According to an embodiment, the specified UI may include an application information area associated with the iris recognition function and a screen area in which the target location object 163 that allows the eye area of an image to be matched to a screen specific location is included.

In operation 407, the processor 120 (e.g., the RGB camera control module 20) may determine whether the detected feature points satisfy a specified condition. In the case where the detected feature points do not satisfy the specified condition, the processor 120 may skip operation 409. The specified condition may include a condition that locations of the detected feature points displayed on the display 160 are located at a specified point (e.g., a point where the feature points corresponding to the eye area at least partly overlap the target location object 163). Alternatively, the specified condition may include a condition that the detected feature points displayed at the specified point and the detected feature points are located within a range of a specified size (e.g., a condition that the feature points corresponding to the eye area is located within a specific distance from the target location object 163).

To satisfy the specified condition, a user may adjust at least one of the capture direction and the capture distance of the RGB camera 141 by moving the electronic device 100 or subject (e.g., the user's face). For example, the user may adjust a user's face direction facing the RGB camera 141, the direction of the RGB camera 141 that faces the user's face, a distance between the RGB camera 141 and the user's face, or the like. In the above-described operation, the processor 120 may output guide information corresponding to the adjusted direction of the user's face or the adjusted distance. For example, the processor 120 may output guide information for requesting to rotate the user's face to the left or to the right, guide information for requesting the user to lower the user's chin down or to lift the user's chin up, guide information for guiding a distance of forward movement or backward movement of the electronic device 100 to maintain a proper distance between the user's face and the RGB camera device 140, or the like.

When the user's face or the electronic device 100 moves, the processor 120 may change the location of the indicator 164. In the case where the indicator 164 overlaps the target location object 163 or is located within a specified distance from the target location object 163, the processor 120 may determine that the specified condition is satisfied. In this operation, the processor 120 may output guide information according to the satisfaction of the specified condition. For example, the processor 120 may change at least one of the color or the shape of at least one of the indicator 164 and the target location object 163. Alternatively, the processor 120 may output audio information, vibration, a lamp, or the like that indicates the satisfaction of the specified condition.

In the case where the detected feature points satisfy the specified condition, in operation 409, the processor 120 (e.g., the IR camera control module 40) may recognize and process an iris based on the IR camera device 150. For example, the processor 120 may obtain an iris image and may perform comparison and analysis on the iris image, and then the processor 120 may output guide information about iris recognition success or iris recognition failure. When the iris recognition is successful, the processor 120 may process the execution of a specified application. When the iris recognition fails, the processor 120 may obtain an IR image including the iris image again, and may repeat a comparison task during a specified frequency. When the iris recognition fails during a specified frequency, the state of the processor 120 may be transitioned to a turn-off state. Afterwards, the processor 120 may execute the iris recognition function again or may output a screen interface associated with another authentication method such as a password input, a fingerprint input, or the like, depending on the set policy.

In operation 411, the processor 120 may determine whether an event (e.g., completion according to the iris authentication or completion according to the iris authentication failure) associated with the completion of the iris recognition function occurs. In the case where the event associated with the completion of the iris recognition function does not occur, the processor 120 may return to the operations before operation 409 or operation 405 depending on the previous state to perform the following operations again. If the event associated with the completion of the iris recognition function occurs, the processor 120 may end the iris recognition function.

Figure 5:
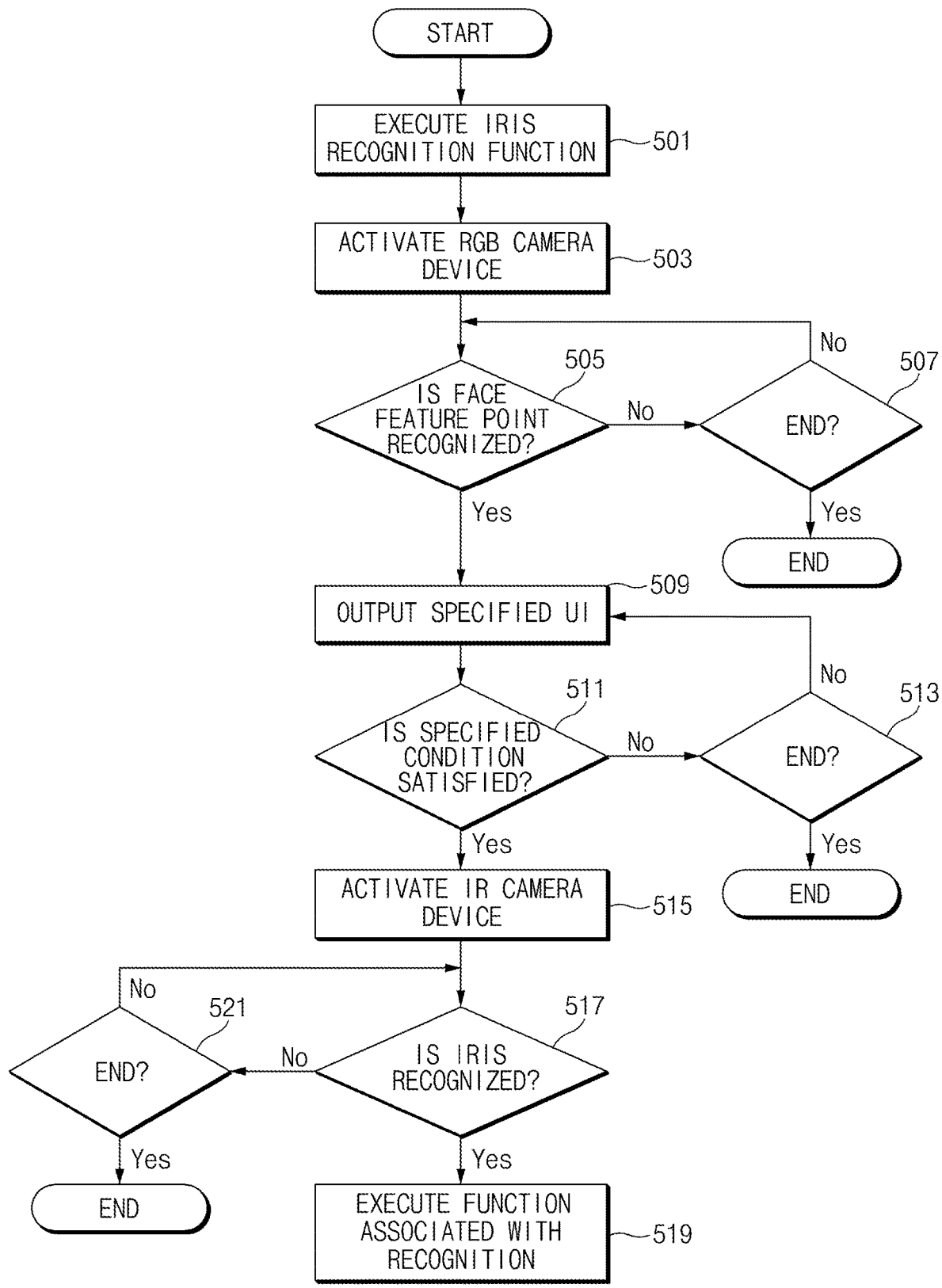
FIG. 5 is a flowchart illustrating an example of an iris recognition function operating method including an operation of outputting a user interface (UI), according to an embodiment of the present disclosure.

FIG. 5 is a flowchart illustrating an example of an iris recognition function operating method including an operation of outputting a UI, according to an embodiment of the present disclosure.

Referring to FIG. 5, with regard to the iris recognition function operating method, in operation 501, the processor 120 may receive a user input or a set event associated with the execution of the iris recognition function. For example, the processor 120 may output an icon or a menu associated with the iris recognition function, an icon for executing an application associated with the iris recognition function, or the like to the display 160. When selecting the corresponding icon, the processor 120 may determine that an event for requesting the execution of the iris recognition function occurs. Alternatively, the processor 120 may determine that a request to unlock a lock screen is a request for the execution of the iris recognition function.

If the execution of the iris recognition function is requested, in operation 503, the processor 120 may activate the RGB camera device 140. The processor 120 may analyze an RGB preview image that the RGB camera 141 obtains.

In operation 505, the processor 120 may determine whether a face feature point is recognized. In the case where the face feature point is not recognized, in operation 507, the processor 120 may determine whether an event associated with the completion of iris recognition function occurs. If the event associated with the completion of iris recognition function does not occur, the processor 120 may return to the operations before operation 505 to perform the following operations again. If the event associated with the completion of the iris recognition function is present, the processor 120 may deactivate the RGB camera device 140 while ending the iris recognition function and may return to a specified function.

If the face feature point is recognized, in operation 509, the processor 120 may output the specified UI to the display 160. The specified UI may include a screen interface including the indicator 164 corresponding to a specific area, for example, an eye area in a face and the target location object 163 to which needs to match the indicator 164. In the case where the indicator 164 does not coincide with the target location object 163 or in the case where at least one of the capture direction and the capture distance of the RGB camera 141 is changed, a location at which the indicator 164 is displayed on the display 160 may be changed.

In operation 511, the processor 120 may determine whether the specified condition associated with the specified UI is satisfied. For example, the processor 120 may determine whether the indicator 164 at least partly overlaps the target location object 163. Alternatively, the processor 120 may determine whether the indicator 164 is located within a specific distance based on the target location object 163.

If the specified condition associated with the specified UI is not satisfied, in operation 513, the processor 120 may determine whether the event associated with the completion of the iris recognition function occurs. If the event associated with the completion of iris recognition function does not occur, the processor 120 may return to the operations before operation 509 to maintain a state where the specified UI is output. If the event associated with the completion of the iris recognition function occurs, the processor 120 may deactivate the RGB camera device 140 while ending the iris recognition function and may interrupt the output of the specified UI. Alternatively, the processor 120 may return to a specified function state.

If the specified condition associated with the specified UI is satisfied, in operation 515, the processor 120 may activate the IR camera device 150. For example, the processor 120 may control the IR light emitting unit 152 to output a specified light and may obtain an IR preview image or an IR still image by using the IR camera 151.

In operation 517, the processor 120 may determine whether the iris recognition is completed. In the case where the iris recognition is completed, in operation 519, the processor 120 may execute a function associated with recognition. In this operation, the processor 120 may perform the iris recognition through comparison between an iris image obtained from the IR preview image and information pre-stored in the memory 130.

In the case where the iris recognition fails, in operation 521, the processor 120 may determine whether the event associated with the completion of the iris recognition function occurs. If the event associated with the completion of the iris recognition function does not occur, the processor 120 may return to operation 517 and may perform an iris recognition operation again.

Figure 6:
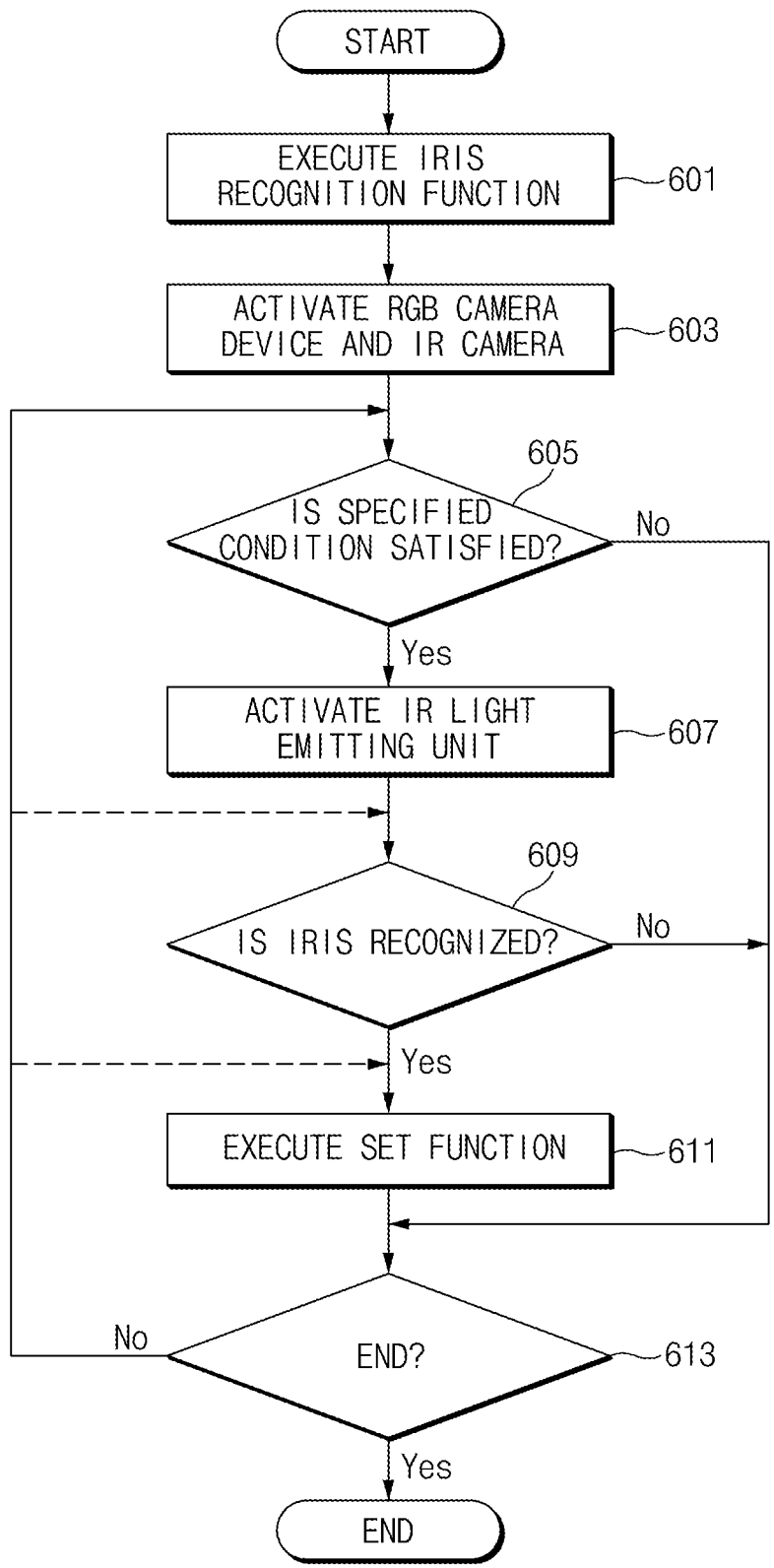
FIG. 6 is a flowchart illustrating an example of an infra-red (IR) camera activation method associated with an operation of an iris recognition function, according to an embodiment of the present disclosure.

FIG. 6 is a flowchart illustrating an example of an IR camera activation method associated with an operation of an iris recognition function, according to an embodiment of the present disclosure.

Referring to FIG. 6, with regard to the IR camera activation method, in operation 601, the processor 120 may receive a request for the execution of the iris recognition function. In this case, in operation 603, the processor 120 may activate the RGB camera device 140 and the IR camera 151. The processor 120 may keep the activated IR camera 151 in a standby state and may obtain an RGB preview image based on the RGB camera device 140.

In operation 605, the processor 120 may determine whether an RGB image obtained based on the RGB camera device 140 satisfies a specified condition. For example, the processor 120 may determine whether the display location (or the display location of the indicator 164 corresponding to an eye area or an iris area) of an eye area (or an iris area) detected from the RGB preview image coincides with the location of the specified target location object 163 or is in a state where the eye area is located within a specific distance from the target location object 163.

In the case where the obtained RGB image satisfies the specified condition, in operation 607, the processor 120 may activate the IR light emitting unit 152. According to an embodiment, the RGB camera controller 142 included in the RGB camera device 140 or the RGB camera control module 20 may control the IR light emitting unit 152 to emit the light of a specified wavelength band. In this regard, the electronic device 100 may further include a signal line between the IR light emitting unit 152 and the RGB camera controller 142 or the RGB camera control module 20. The RGB camera controller 142 or the RGB camera control module 20 may transmit a signal associated with the turn-on control or turn-off control of the IR light emitting unit 152 through the signal line.

In operation 609, the processor 120 may determine whether the iris recognition is successful, based on the IR image obtained by the IR camera 151. After the light of the specified wavelength band is emitted from the IR light emitting unit 152, the IR camera 151 may collect infrared light reflected from the user's eye area or the iris area and may obtain an IR preview image or an IR still image. The processor 120 may compare iris area information in the collected IR preview image or IR still image with information pre-stored in the memory 130 to process iris recognition.

If the iris recognition is successful, in operation 611, the processor 120 may execute a set function. For example, the processor 120 may unlock a lock screen, may execute a financial application, or may process a payment, depending on a type of an application that requests the execution of the iris recognition function.

In operation 613, the processor 120 may determine whether a function ending event associated with the iris recognition occurs. If the function ending event associated with the iris recognition does not occur, the processor 120 may return to operation 605, operation 609, or operation 611, depending on the previous state and may perform the following operations again. If the function ending event associated with the iris recognition occurs, the processor 120 may return to a specified function or may return to a specified state (e.g., a sleep state or the like).

With the above-described operations, when the specified condition is satisfied, the electronic device 100 according to an embodiment of the present disclosure may save a time required to activate the IR camera 151, and then may rapidly process the iris recognition. The electronic device 100 may activate the IR light emitting unit 152 when the specified condition is satisfied, thereby reducing power consumption for the irradiation of the IR light emitting unit 152. Since the electronic device 100 allows the IR light emitting unit 152 to emit the light of the specified wavelength band, thereby reducing the inconvenience of the user's view (e.g., the reluctance of an infrared color).

Figure 7:
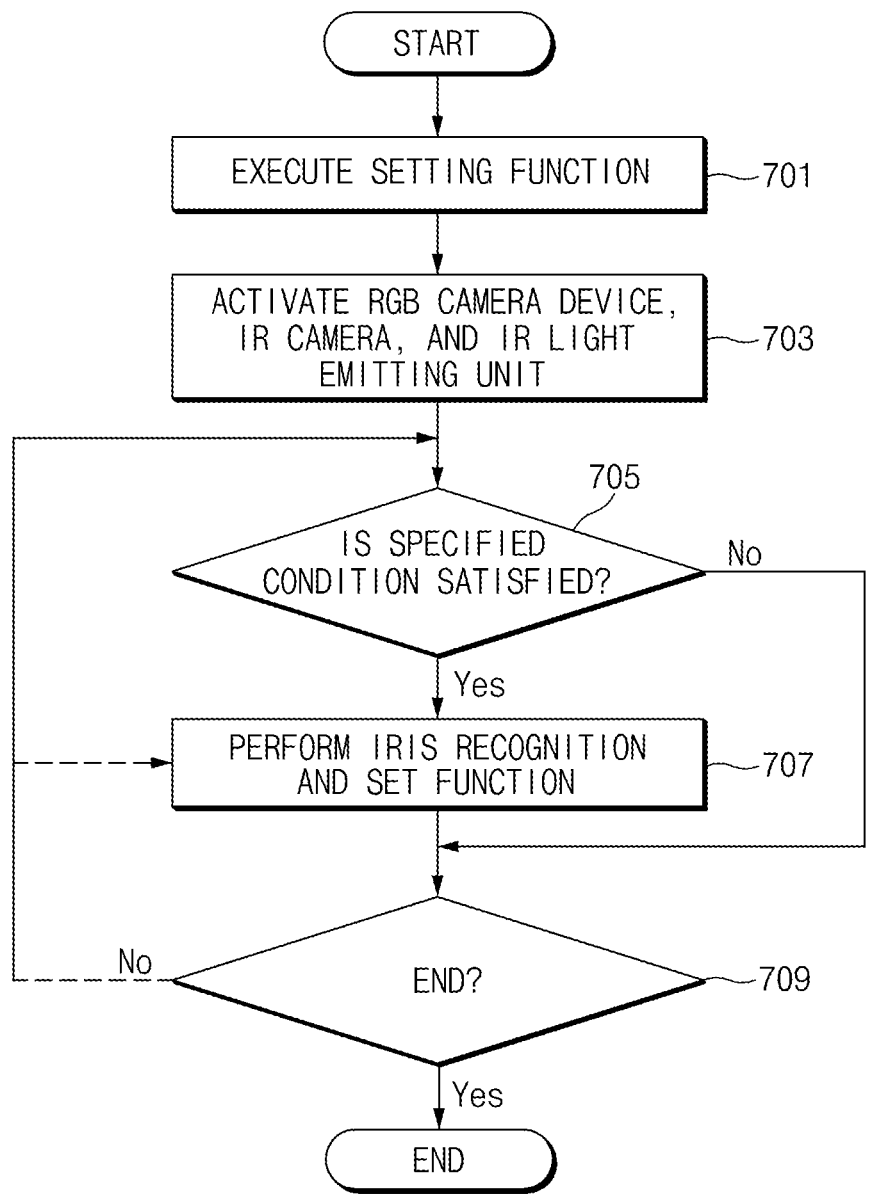
FIG. 7 is a flowchart illustrating another example of an IR camera activation method associated with an operation of an iris recognition function, according to an embodiment of the present disclosure.

FIG. 7 is a flowchart illustrating another example of an IR camera activation method associated with an operation of an iris recognition function, according to an embodiment of the present disclosure.

Referring to FIG. 7, with regard to the IR camera activation method, in operation 701, the processor 120 may receive a request for the execution of the iris recognition function. In operation 703, the processor 120 may activate the RGB camera device 140, the IR camera 151, and the IR light emitting unit 152. In this operation, the processor 120 may analyze an image obtained through the RGB camera device 140, and the IR light emitting unit 152 and the IR camera 151 may keep a standby state while the IR light emitting unit 152 and the IR camera 151 receive power. Through the above-described operation, the processor 120 may allow iris recognition based on the IR camera device 150 not to be performed, thereby suppressing unnecessary power consumption.

In operation 705, the processor 120 may determine whether an RGB image obtained through the RGB camera device 140 satisfies a specified condition. For example, the specified condition may include a state where a user's face or a specific area of the face is located at a specific location on the display 160. As described above, the specified condition may include a condition that an eye area or an iris area, or the indicator 164 corresponding to the eye area or the iris area at least partly overlaps the preset target location object 163.

In the case where the obtained RGB image satisfies the specified condition, in operation 707, the processor 120 may perform iris recognition and set function processing. In operation 709, the processor 120 may determine whether a function ending event associated with the iris recognition occurs. If the function ending event associated with the iris recognition does not occur, the processor 120 may return to operation 705 or operation 707, depending on the previous state and may perform the following operations again. If the function ending event associated with the iris recognition occurs, the processor 120 may return to a specified function or may return to a specified state (e.g., a sleep state or the like).

According to various embodiments of the present disclosure, a method for operating an iris recognition function may include receiving a request for execution of an iris recognition function, obtaining a first image of a subject based on a first camera device, outputting information about a feature point of the obtained first image in a display, and if the information of the feature point satisfies a specified condition, obtain a second image associated with the subject based on a second camera device different from the first camera device, wherein a display location of the information about the feature point is changed depending on a capture angle between the subject and the first camera device.

According to an embodiment, the obtaining of the second image may include determining whether the subject is a human's face in the first image, if the subject is the human's face, extracting a feature point of the human's face or extracting a feature point of an eye area included in the human's face, and determining whether information associated with the extracted feature point of the human's face or the extracted feature point of the eye area satisfies the specified condition.

According to an embodiment, the obtaining of the second image may include determining whether the feature point is adjacent to a specified location of the display or at least portion of the feature point overlaps the specified location.

According to an embodiment, the obtaining of the second image may include outputting at least one of an indicator object corresponding to the feature point or a target location object, at which the indicator object needs to be located, on the display.

According to an embodiment, the obtaining of the second image may include, if at least portion of the indicator object overlaps the target location object, obtaining the second image based on the second camera device.

According to an embodiment, the method may further include activating the first camera device and the second camera device before obtaining the first image corresponding to a request of the execution of the iris recognition function.

According to an embodiment, the obtaining of the second image may include, if the specified condition is satisfied, activating a light emitting unit configured to emit light of a frequency band associated with image capture of the second camera device.

According to an embodiment, the method may further include deactivating a second camera and a light emitting unit associated with the second camera, which are included in the second camera device, during the first camera device is activated, wherein the obtaining of the second image may include if the specified condition is satisfied, activating the light emitting unit and the second camera.

According to an embodiment, the outputting of the information about the feature point of the obtained first image in the display may include detecting an eye area of the subject, and mapping and outputting a feature point corresponding to the eye area to eye area information of an image stored in a memory.

According to an embodiment, the outputting of the information about the feature point of the obtained first image in the display may include adjusting at least one of a display size, a display location, or a display direction of the image in response to a change in a display size or a display location of the feature point corresponding to the eye area.

Figure 8:
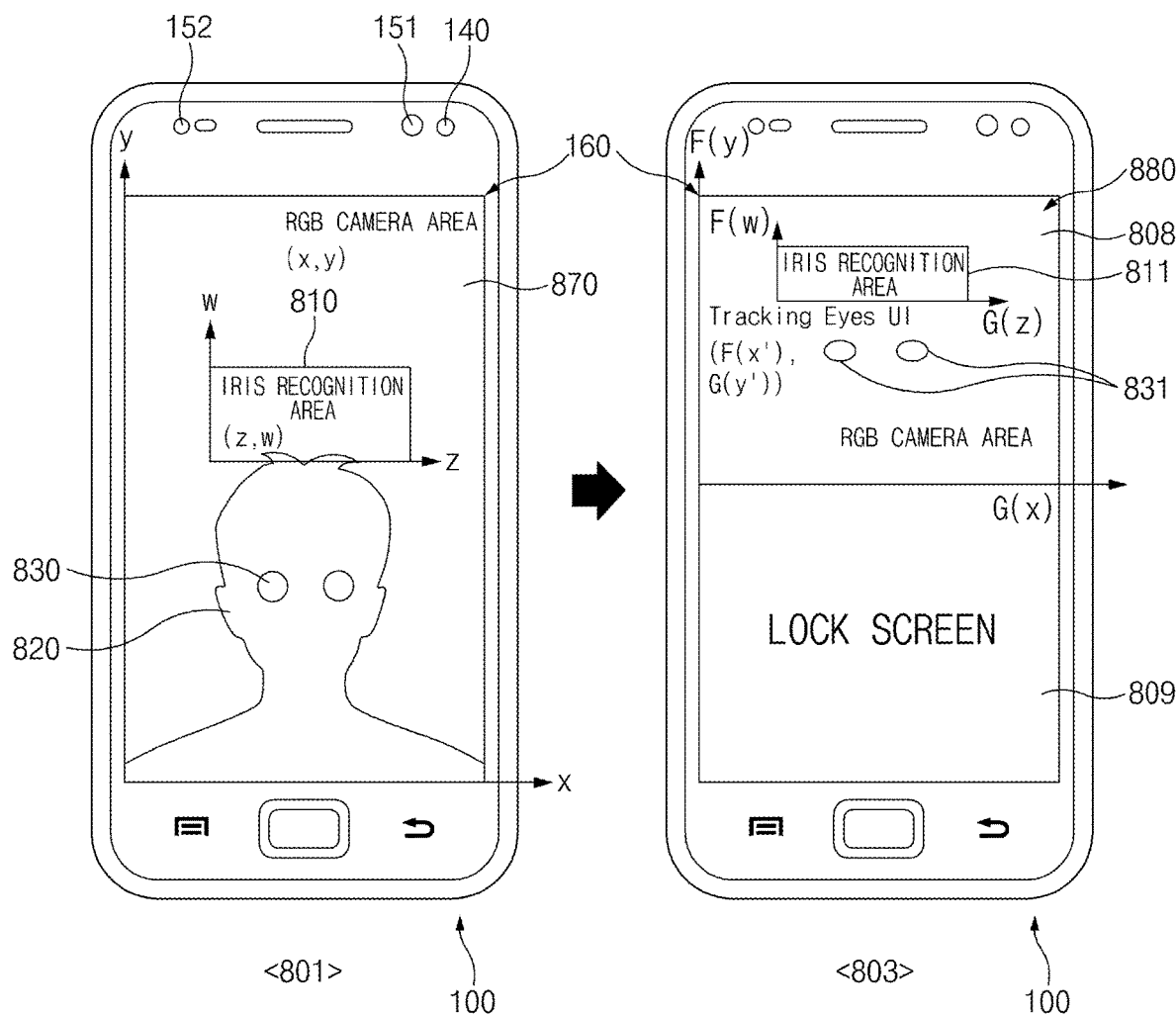
FIG. 8 is a view for describing a screen interface outputting method based on a red, green, blue (RGB) camera device associated with an iris recognition function, according to an embodiment of the present disclosure.

FIG. 8 is a view for describing a screen interface outputting method based on an RGB camera device associated with an iris recognition function, according to an embodiment of the present disclosure.

Referring to FIG. 8, in the case where the RGB camera device 140 of the electronic device 100 obtains an RGB preview image, the processor 120 of the electronic device 100 may output an RGB UI screen 870 corresponding to the RGB preview image illustrated in a screen 801. At this time, the RGB UI screen 870 may display a screen corresponding to the RGB preview image, in the whole area of the display 160. The RGB UI screen 870 may be defined as a first coordinate system (X, Y). The processor 120 of the electronic device 100 may detect a face area 820 or an eye area 830 (or an iris area) from the RGB preview image. According to an embodiment, if detecting the eye area 830, the processor 120 of the electronic device 100 may extract coordinates (X', Y') of the RGB UI screen 870 associated with the corresponding eye area 830. On the basis of the RGB UI screen 870, an iris recognition area 810 (e.g., an area at which the user's eye area 830 needs to be located) may correspond to a specified target point area (e.g., Z, W) as illustrated in FIG. 8.

As illustrated in the screen 803, the electronic device 100 may change and output the above-described RGB UI screen 870 to a transformation UI 880 associated with the iris recognition. In a process of generating the transformation UI 880, after changing X-axis and Y-axis to a specific function ratio (e.g., G(x), F(y)), the processor 120 of the electronic device 100 may output the specific function ratio to a first area 808 of the display 160. When the preview image of the screen 801 is changed to the transformation UI 880 of the screen 803, the eye area 830 may be changed to an eye transformation area 831. For example, the coordinates of the eye transformation area 831 may correspond to (G(x'), F(y')). The above-described coordinate transformation function (G(x), F(y)) may be changed depending on a designer's intention. As illustrated in FIG. 8, the previous iris recognition area 810 may be replaced by an iris recognition transformation area 811, depending on the output of the transformation UI 880. An embodiment is illustrated in FIG. 8 as the iris recognition transformation area 811 is located above the iris recognition area 810 on the display 160 depending on a ratio change.

According to various embodiments, the processor 120 of the electronic device 100 may output a screen of an application associated with the execution of the iris recognition function to a second area 809 of the display 160. An embodiment is illustrated in FIG. 8 as at least part of a lock screen is displayed in the second area 809 depending on a request for the execution of the iris recognition function to unlock the lock screen. The lock screen displayed in the second area 809 may include a form in which a shape displayed the whole screen of the display 160 is adjusted at a specific rate.

The processor 120 of the electronic device 100 may provide a UI as illustrated in the screen 801 depending on user settings or may output the transformation UI 880 as illustrated in the screen 803. According to various embodiments, in the case where the IR camera 151 is activated in a state where the user's face is detected by using the RGB camera device 140 and the eye area 830 is located within a specified distance from the iris recognition area 810, the transformation UI 880 may be output as illustrated in the screen 803.

With regard to the execution of the above-described operation, the processor 120 of the electronic device 100 may align the iris recognition area 810 (e.g., an IR camera recognition angle) with the area of the RGB camera device 140 and may calculate dynamic coordinates of a face feature point that is based on the RGB camera device 140. The processor 120 may change the coordinates of the eye area or the face feature point, which is recognized by using the RGB camera device 140, to plane relative coordinates (e.g., a reduction area (e.g., coordinates corresponding to the first area 808) associated with iris recognition) by using transformation functions F and G of the iris recognition transformation area 811, which is compared with the iris recognition area 810, on the final transformation UI 880. The processor 120 may display the transformation UI 880 based on the changed state coordinate. Alternatively, as described above, the processor 120 may output the preview image obtained based on the RGB camera device 140 to the whole screen and may display the eye area and the face area in the preview image obtained based on the recognition angle of the IR camera 151. In this case, the processor 120 may output a target location object, which is matched to the user's eye area or a feature point of the face, based on the whole area of the display 160. The processor 120 may change the display location of the eye area or the feature point of the face or an indicator corresponding to the eye area or the feature point of the face based on a capture angle change (e.g., a change that the electronic device 100 rotates or moves to change the capture direction of the RGB camera device 140 of the electronic device 100) of the RGB camera device 140. If the target location object coincides with the indicator (or the matching rate is not less than a specified value), the processor 120 may perform iris recognition based on the IR light emitting unit 152 and the IR camera 151.

Figure 9:
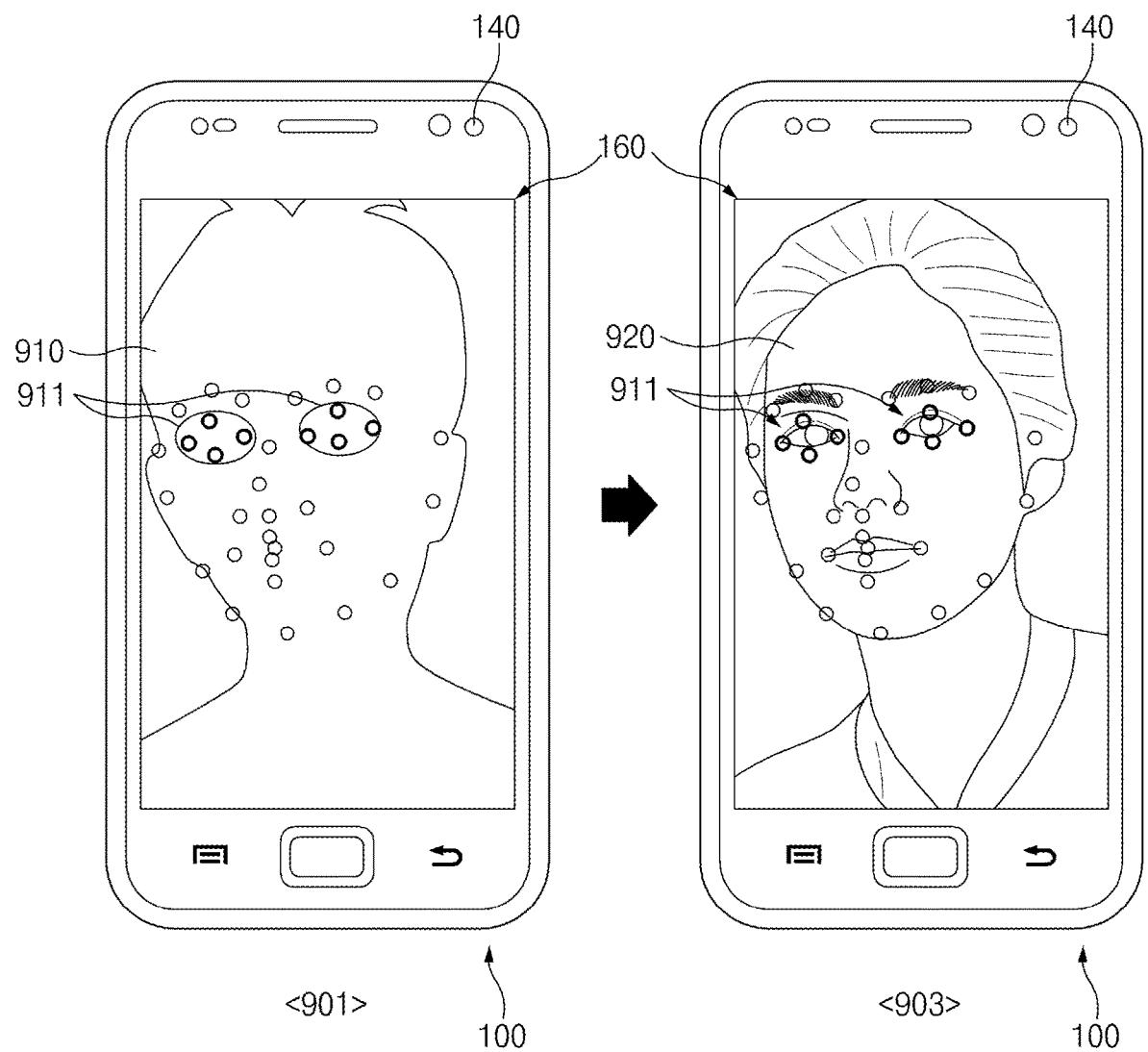
FIG. 9 is a view illustrating an example of a UI transformation, according to an embodiment of the present disclosure.

FIG. 9 is a view illustrating an example of a UI transformation, according to an embodiment of the present disclosure.

Referring to FIG. 9, the processor 120 of the electronic device 100 may activate the RGB camera device 140 in response to a request for the execution of the iris recognition function and then may obtain an RGB preview image. While extracting an eye area or a feature point of a face from the RGB preview image, the processor 120 may obtain silhouette information of the obtained preview image through filtering or boundary extraction, or the like. With the above description, as illustrated in a screen 901, the processor 120 may display a silhouette image 910 and specified feature point information 911. The specified feature point information 911 may include feature points, which correspond to an eye area, from among a plurality of feature points obtained from the RGB preview image. The specified feature point information 911 may be displayed to be different from other feature points or may be grouped.

While displaying the silhouette image 910 and the specified feature point information 911 in the display 160 during a specified time, the processor 120 of the electronic device 100 may output a specified image 920 stored in the memory 130, instead of the silhouette image 910. For example, the specified image 920 may include an image that is set to be used for an iris recognition function depending on user settings. For example, the specified image 920 may be a specific person photo such as a celebrity or the like (e.g., as illustrated in screen 903). Alternatively, the specified image 920 may be a photo, picture, or the like of a specific person, which a user designates, from among photos of various persons stored in a gallery. Alternatively, the specified image 920 may be a photo, which the RGB camera device currently captures and which is associated with the user, or a current photo.

While outputting the specified image 920, the processor 120 may map the specified feature point information 911 to the specified image 920. In this operation, to map the specified feature point information 911 to the specified image 920, the processor 120 may change the specified image 920. According to an embodiment, in the case where the specified feature point information 911 is information corresponding to the eye area, the processor 120 may adjust at least one of the display size or the location of the specified image 920 such that the eye area of the specified image 920 coincides with the specified feature point information 911 (or the eye area of the specified image 920 coincides with the specified feature point information 911 within a specified tolerance range). For example, the processor 120 may adjust the size of the eye area, the interval of the eye area, or the like of the specified image 920 to coincide with the specified feature point information 911.

Figure 10:
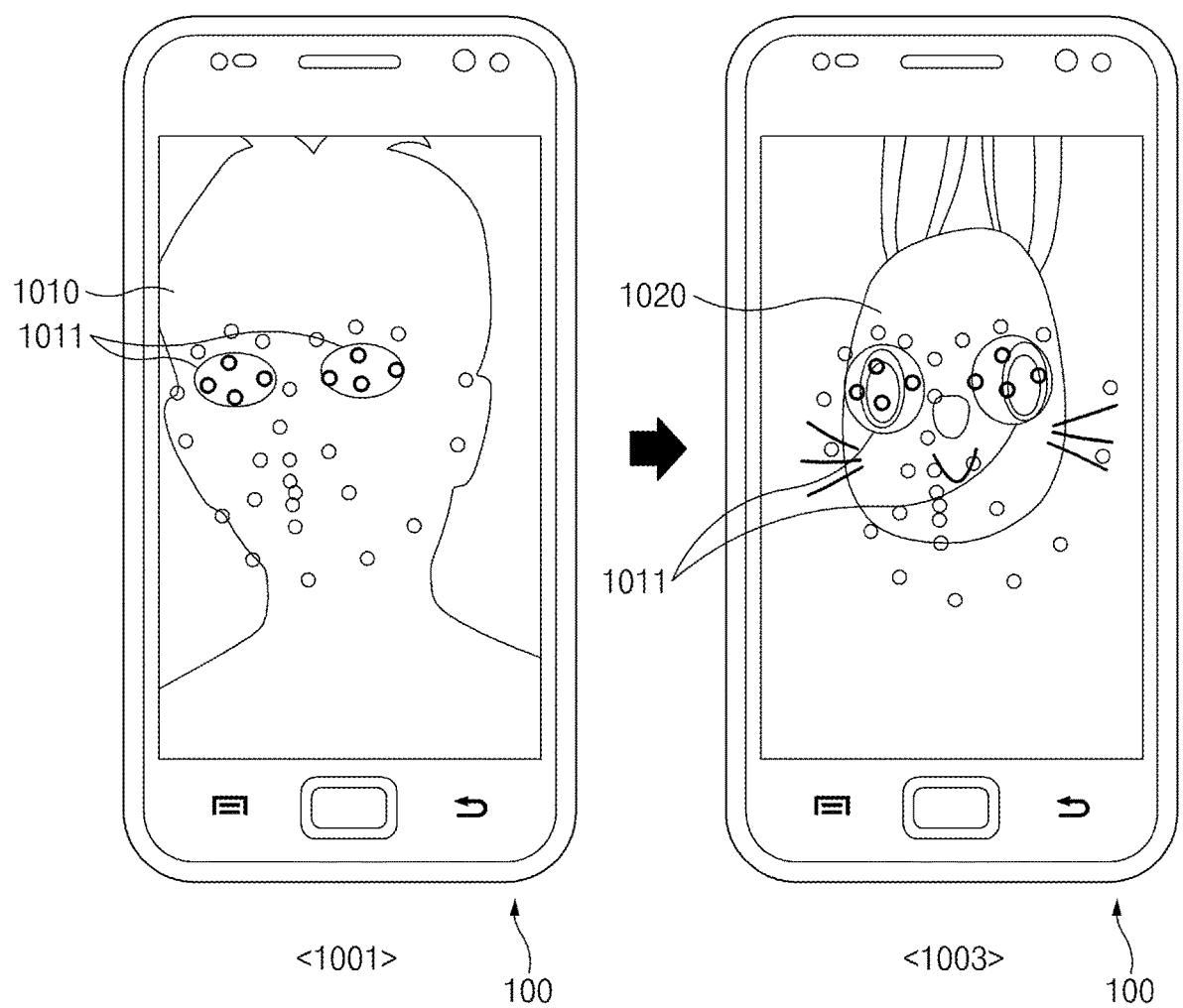
FIG. 10 is a view illustrating another example of a UI transformation, according to an embodiment of the present disclosure.

FIG. 10 is a view illustrating another example of a UI transformation, according to an embodiment of the present disclosure.

Referring to FIG. 10, as described in FIG. 9, the processor 120 of the electronic device 100 may activate the RGB camera device 140 in response to a request for the execution of the iris recognition function and then may obtain an RGB preview image. While extracting an eye area or a feature point of a face from the RGB preview image, the processor 120 may obtain silhouette information of the obtained preview image through filtering or boundary extraction, or the like. With the above description, as illustrated in a screen 1001, the processor 120 may display a silhouette image 1010 and specified feature point information 1011.

While displaying the silhouette image 1010 and the specified feature point information 1011 in the display 160 during a specified time, the processor 120 of the electronic device 100 may output a character image 1020 stored in the memory 130, instead of the silhouette image 1010. For example, the character image 1020 may include an image that is set to be used for an iris recognition function depending on user settings. The character image 1020 may be an image, which is received from a server or the like or is received from another external electronic device. Alternatively, the character image 1020 may include an image that a user creates.

While outputting the character image 1020, the processor 120 may adjust at least one of the size, display direction, or location of the character image 1020 to map the specified feature point information 1011. For example, the processor 120 may adjust at least one of the display size, display direction, display location of the character image 1020 such that the size, display direction, or shape of the specific area (e.g., the eye area of the character image 1020 in the case where the specified feature point information 1011 is an eye area) of the character image 1020 corresponding to the specified feature point information 1011 coincides with the specified feature point information 1011 (or the size, display direction, or shape of the specific area of the character image 1020 coincides with the specified feature point information 1011 within a specified tolerance range). Additionally, while outputting the character image 1020, the processor 120 may output a target location object, at which the specified feature point information 1011 needs to be located, in the display 160.

An embodiment is exemplified in FIGS. 9 and 10 as the specified image 920 or the character image 1020 is output after outputting the silhouette images 910 and 1010 and the pieces of specified feature point information 911 and 1011 first. However, embodiments of the present disclosure may not be limited thereto. For example, if specified feature point information is extracted from the preview image that the RGB camera device 140 obtains, the processor 120 may output the specified image 920 or the character image 1020 that is suitable for the specified feature point information, without outputting the silhouette image 1010.

In addition, if the capture direction or the distance of the RGB camera device 140 of the electronic device 100 is changed while outputting the specified image 920 or the character image 1020, the processor 120 may change the display size or the display direction of the specified image 920 or the character image 1020. In this operation, the processor 120 may analyze an image based on the preview image obtained through the RGB camera device 140 in real time or at a specific period to maintain the extraction of a face feature point or an eye area.

Figure 11:
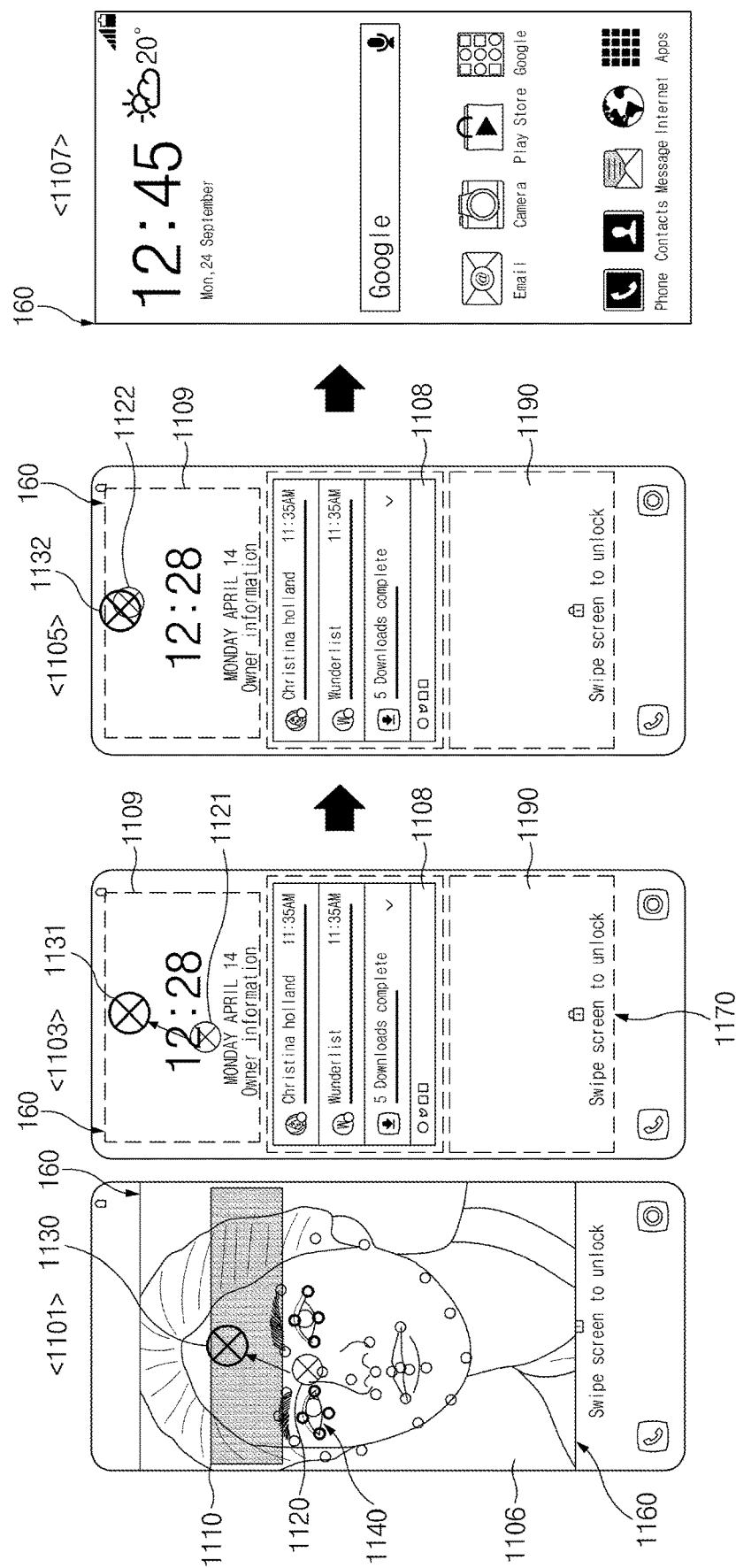
FIG. 11 is a view illustrating an example of UI matching, according to an embodiment of the present disclosure.

FIG. 11 is a view illustrating an example of UI matching, according to an embodiment of the present disclosure.

Referring to FIG. 11, if the execution of the iris recognition function is requested, the processor 120 of the electronic device 100 may activate an RGB camera device to obtain an RGB preview image, and may output an RGB UI screen 1160 corresponding to the RGB preview image obtained as illustrated a screen 1101, in the display 160. Alternatively, as described in FIG. 9 or 10, the processor 120 may output an image or a character image that a user or a system designates. The processor 120 may extract feature points from a preview image and may output an indicator 1120 based on feature points of a specified area (e.g., an eye area). In addition, the processor 120 may output a target location object 1130 to which the indicator 1120 needs to be mapped. For example, the target location object 1130 may be displayed in an IR camera recognition angle area 1110. The IR camera recognition angle area 1110 may be an area in which a user's eye area needs to be located. The user may change the capture direction of the RGB camera device or may change the user's face location or direction such that the user's eye area is disposed in the IR camera recognition angle area 1110. The IR camera recognition angle area 1110 may include an area to which a capture angle of the IR camera 151 for iris recognition is mapped in the preview image obtained by the RGB camera device. If the capture angle of an RGB camera device is changed (e.g., the capture angle of the RGB camera device is changed depending on rotating or moving the electronic device 100), the processor 120 may change the display location of the indicator 1120 in response to an angle change.

According to various embodiments, the processor 120 of the electronic device 100 may output only the indicator 1120 and the target location object 1130 in a specific area (e.g., the IR camera recognition angle area 1110) as illustrated in a screen 1103, by using the preview image obtained based on the RGB camera device. In this regard, as described in FIG. 8, the processor 120 may perform a process of changing the RGB preview image obtained based on the RGB camera device to the coordinates of an iris UI 1170 associated with the execution of the iris recognition function. For example, the iris UI 1170 may include a feature point matching area 1109 in which a coordinate-transformed indicator 1121, a coordinate-transformed target location object 1131, and the like are displayed, a system information area 1108, and an application information area 1190 necessary for iris recognition. The system information area 1108 may be an area for outputting a notification associated with information that the electronic device 100 obtains before the execution of the iris recognition function or information of a specified alarm, a notification according to message reception, or the like. For example, the application information area 1190 may include information of a lock screen or a financial payment being processed, guide information about a function to which security is set, or the like.

According to various embodiments, as illustrated in the screen 1101, after outputting a specified image 1106 based on the RGB camera device, the indicator 1120 based on the specified feature point information, the target location object 1130, or the like, the processor 120 may output a screen 1103 in the display 160 depending on the occurrence of a specified event. For example, when a specified time elapses after outputting the screen 1101, the processor 120 may output the screen 1103 in the display 160. Alternatively, after outputting the screen 1101, in the case where specified feature point information 1140 is obtained more than a specific size or is located within a specific distance from the target location object 1130, the processor 120 may output the screen 1103. Alternatively, even though obtaining the RGB preview image by activating the RGB camera device in response to a request for the execution of the iris recognition function, the processor 120 may output the screen 1103 in the display 160 at once without outputting the screen 1101.

As illustrated in a screen 1105, in the case where an indicator 1122 at least partly overlaps a target location object 1132 or the indicator 1122 is located within a specified distance from the target location object 1132 in response to a change in the location or direction of the electronic device 100 or a change in a user's face location or direction, the processor 120 may perform iris recognition based on an IR camera. As described above in the screen 1103, the screen 1105 may output the feature point matching area 1109, the system information area 1108, and the application information area 1190 and may change the display location of an indicator 1122 in response to a change in a capture angle or subject location.

If the iris recognition is successful, as illustrated in the screen 1107, the processor 120 may execute a specified function. For example, if the lock screen is unlocked, the processor 120 may output a specified standby screen in the display 160. According to various embodiments, the execution of the iris recognition function may be requested with regard to the execution of a function of a finance payment or the like. If the iris recognition is successful, the processor 120 may output result information according to the finance payment, in the display 160.

Figure 12:
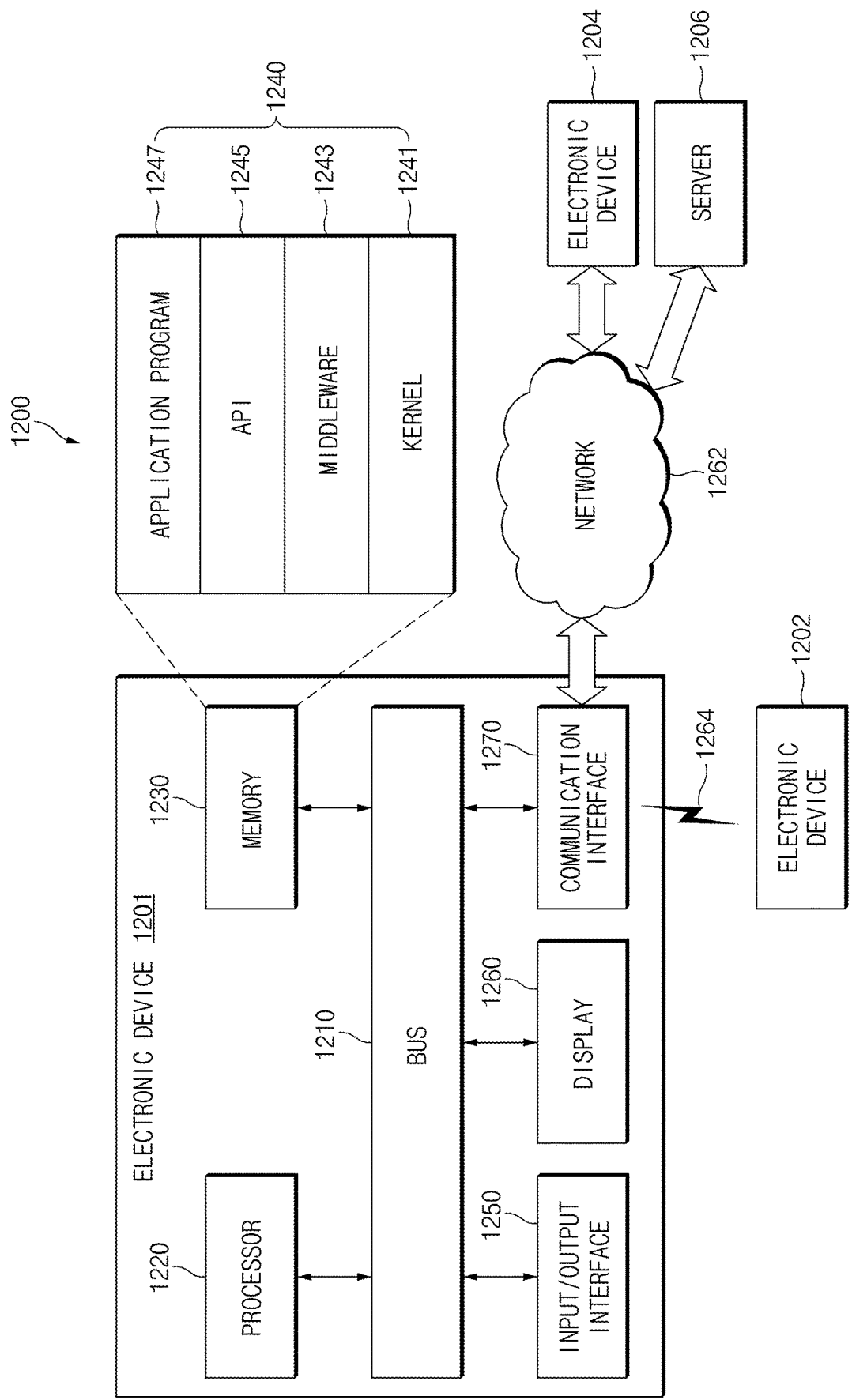
FIG. 12 is a block diagram illustrating a configuration of an electronic device in a network environment according to an embodiment of the present disclosure.

FIG. 12 is a block diagram 1200 illustrating a configuration of an electronic device in a network environment according to an embodiment of the present disclosure.

Referring to FIG. 12, in various embodiments, an electronic device 1201 and a first external electronic device 1202, a second external electronic device 1204, or a server 1206 may connect with each other through a network 1262 or local-area communication 1264. The electronic device 1201 may include a bus 1210, a processor 1220, a memory 1230, an input and output interface 1250, a display 1260, and a communication interface 1270. In various embodiments, at least one of the components may be omitted from the electronic device 1201, or other components may be additionally included in the electronic device 1201. According to various embodiments, the electronic device 1201 may receive image associated with transformation UI from an external device (e.g., an external electronic device 1202, 1204, server 1206) connected with network. Additionally, the electronic device 1201 may perform an access to a specified server or to a specified another electronic device according to a success of iris recognition.

The bus 1210 may be, for example, a circuit which connects the components 1220 to 1270 with each other and transmits a communication signal (e.g., a control message and/or data) between the components.

The processor 1220 may include one or more of a central processing unit (CPU), an application processor (AP), or a communication processor (CP). For example, the processor 1220 may perform calculation or data processing about control and/or communication of at least another of the components of the electronic device 1201.

The memory 1230 may include a volatile and/or non-volatile memory. The memory 1230 may store, for example, a command or data associated with at least another of the components of the electronic device 1201. According to an embodiment, the memory 1230 may store software and/or a program 1240. The program 1240 may include, for example, a kernel 1241, a middleware 1243, an application programming interface (API) 1245, and/or at least one application program 1247 (or "at least one application"), and the like. At least part of the kernel 1241, the middleware 1243, or the API 1245 may be referred to as an operating system (OS).

The kernel 1241 may control or manage, for example, system resources (e.g., the bus 1210, the processor 1220, or the memory 1230, and the like) used to execute an operation or function implemented in the other programs (e.g., the middleware 1243, the API 1245, or the application program 1247). Also, as the middleware 1243, the API 1245, or the application program 1247 accesses a separate component of the electronic device 1201, the kernel 1241 may provide an interface which may control or manage system resources.

The middleware 1243 may play a role as, for example, a go-between such that the API 1245 or the application program 1247 communicates with the kernel 1241 to communicate data.

Also, the middleware 1243 may process one or more work requests, received from the application program 1247, in order of priority. For example, the middleware 1243 may assign priority which may use system resources (the bus 1210, the processor 1220, or the memory 1230, and the like) of the electronic device 1201 to at least one of the at least one application program 1247. For example, the middleware 1243 may perform scheduling or load balancing for the one or more work requests by processing the one or more work requests in order of the priority assigned to the at least one of the at least one application program 1247.

The API 1245 may be, for example, an interface in which the application program 1247 controls a function provided from the kernel 1241 or the middleware 1243. For example, the API 1245 may include at least one interface or function (e.g., a command) for file control, window control, image processing, or text control, and the like.

The input and output interface 1250 may play a role as, for example, an interface which may transmit a command or data input from a user or another external device to another component (or other components) of the electronic device 1201. Also, input and output interface 1250 may output an instruction or data received from another component (or other components) of the electronic device 1201 to the user or the other external device.

The display 1260 may include, for example, a liquid crystal display (LCD), a light emitting diode (LED) display, an organic LED (OLED) display, a microelectromechanical systems (MEMS) display, or an electronic paper display. The display 1260 may display, for example, a variety of content (e.g., text, images, videos, icons, or symbols, and the like) to the user. The display 1260 may include a touch screen, and may receive, for example, touch, gesture, proximity, or a hovering input using an electronic pen or part of a body of the user.

The communication interface 1270 may establish communication between, for example, the electronic device 1201 and an external device (e.g., a first external electronic device 1202, a second external electronic device 1204, or a server 1206). For example, the communication interface 1270 may connect to a network 1262 through wireless communication or wired communication and may communicate with the external device (e.g., the second external electronic device 1204 or the server 1206).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, local-area communication 1264. The local-area communication 1264 may include, for example, at least one of Wi-Fi communication, Bluetooth (BT) communication, near field communication (NFC), or global navigation satellite system (GNSS) communication, and the like.

A magnetic secure transmission (MST) module may generate a pulse based on transmission data using an electromagnetic signal and may generate a magnetic field signal based on the pulse. The electronic device 1201 may output the magnetic field signal to a point of sales (POS) system. The POS system may restore the data by detecting the magnetic field signal using an MST reader and converting the detected magnetic field signal into an electric signal.

The GNSS may include, for example, at least one of a global positioning system (GPS), a Glonass, a Beidou navigation satellite system (hereinafter referred to as "Beidou"), or a Galileo (i.e., the European global satellite-based navigation system) according to an available area or a bandwidth, and the like. Hereinafter, the "GPS" used herein may be interchangeably with the "GNSS". The wired communication may include at least one of, for example, universal serial bus (USB) communication, high definition multimedia interface (HDMI) communication, recommended standard 232 (RS-232) communication, or plain old telephone service (POTS) communication, and the like. The network 1262 may include a telecommunications network, for example, at least one of a computer network (e.g., a local area network (LAN) or a wide area network (WAN)), the Internet, or a telephone network.

Each of the first and second external electronic devices 1202 and 1204 may be the same as or different device from the electronic device 1201. According to an embodiment, the server 1206 may include a group of one or more servers. According to various embodiments, all or some of operations executed in the electronic device 1201 may be executed in another electronic device or a plurality of electronic devices (e.g., the first external electronic device 1202, the second external electronic device 1204, or the server 1206). According to an embodiment, if the electronic device 1201 should perform any function or service automatically or according to a request, it may request another device (e.g., the first external electronic device 1202, the second external electronic device 1204, or the server 106) to perform at least part of the function or service, rather than executing the function or service for itself or in addition to the function or service. The other electronic device (e.g., the first external electronic device 1202, the second external electronic device 1204, or the server 1206) may execute the requested function or the added function and may transmit the executed result to the electronic device 1201. The electronic device 1201 may process the received result without change or additionally and may provide the requested function or service. For this purpose, for example, cloud computing technologies, distributed computing technologies, or client-server computing technologies may be used.

Figure 13:
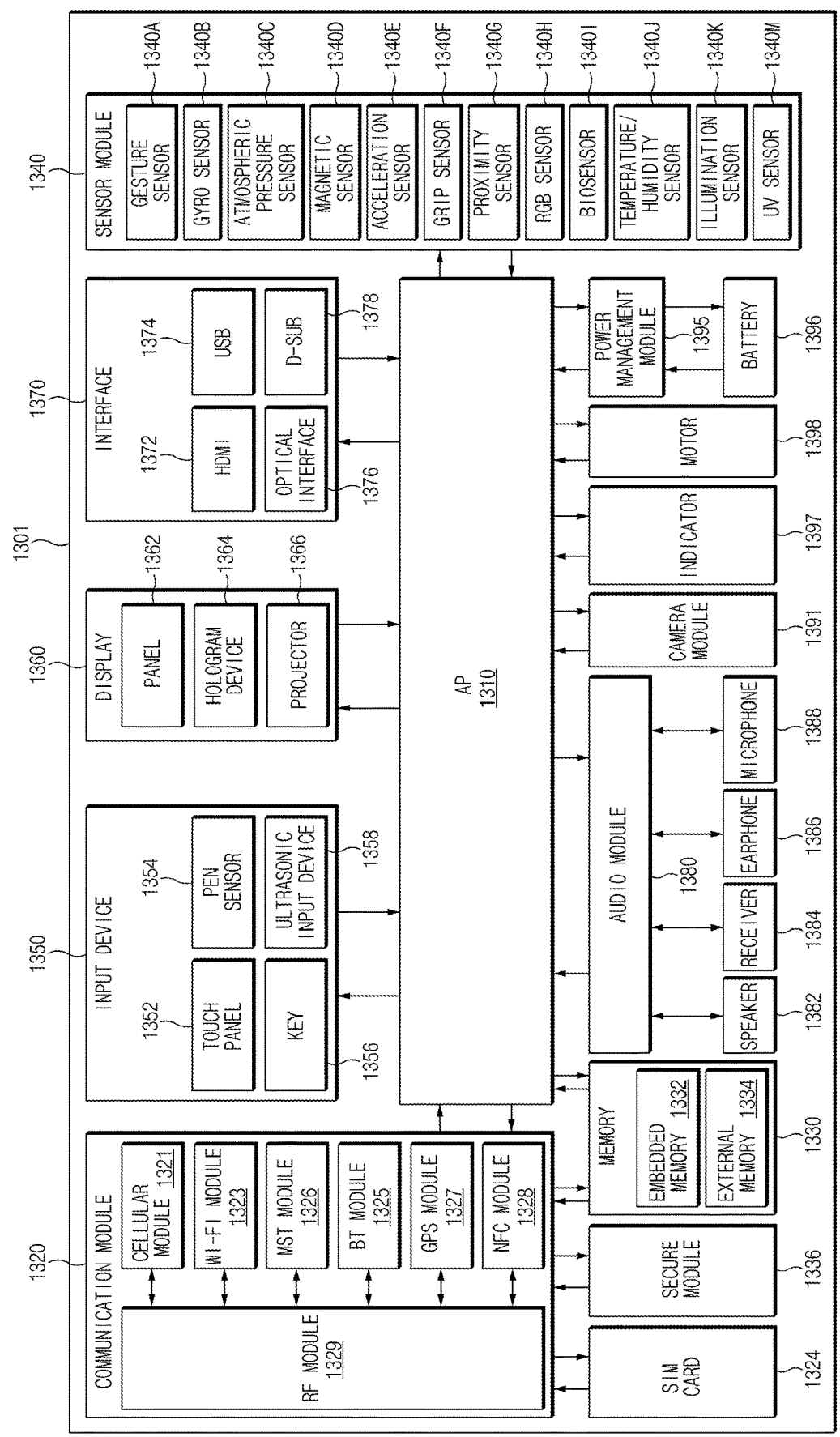
FIG. 13 is a block diagram illustrating a configuration of an electronic device according to various embodiments of the present disclosure.

FIG. 13 is a block diagram illustrating a configuration of an electronic device according to various embodiments of the present disclosure.

Referring to FIG. 13, the electronic device 1301 may include, for example, all or part of an electronic device 1201 shown in FIG. 12. The electronic device 1301 may include one or more processors 1310 (e.g., application processors (APs)), a communication module 1320, a subscriber identification module (SIM) 1329, a memory 1330, a security module 1336, a sensor module 1340, an input device 1350, a display 1360, an interface 1370, an audio module 1380, a camera module 1391, a power management module 1395, a battery 1396, an indicator 1397, and a motor 1398.

The processor 1310 may drive, for example, an OS or an application program to control a plurality of hardware or software components connected thereto and may process and compute a variety of data. The processor 1310 may be implemented with, for example, a system on chip (SoC). According to an embodiment, the processor 1310 may include a graphic processing unit (GPU) (not shown) and/or an image signal processor (ISP) (not shown). The processor 1310 may include at least some (e.g., a cellular module 1321) of the components shown in FIG. 13. The processor 1310 may load a command or data received from at least one of other components (e.g., a non-volatile memory) into a volatile memory to process the data and may store various data in a non-volatile memory.

The communication module 1320 may have the same or similar configuration to a communication interface 1370 of FIG. 12. The communication module 1320 may include, for example, the cellular module 1321, a Wi-Fi module 1323, a Bluetooth (BT) module 1325, a global positioning system (GPS) module 1327 (e.g., a global navigation satellite system (GNSS) module, a Glonass module, a Beidou module, or a Galileo module), a near field communication (NFC) module 1328, an MST module 1326, and a radio frequency (RF) module 1329.

The cellular module 1321 may provide, for example, a voice call service, a video call service, a text message service, or an Internet service, and the like through a communication network. According to an embodiment, the cellular module 1321 may identify and authenticate the electronic device 1301 in a communication network using the SIM 1324 (e.g., a SIM card). According to an embodiment, the cellular module 1321 may perform at least part of functions which may be provided by the processor 1310. According to an embodiment, the cellular module 1321 may include a communication processor (CP).

The Wi-Fi module 1323, the BT module 1325, the GPS module 1327, the NFC module 1328, or the MST module 1326 may include, for example, at least one processor for processing data transmitted and received through the corresponding module. According to various embodiments, at least some (e.g., two or more) of the cellular module 1321, the Wi-Fi module 1323, the BT module 1325, the GPS module 1327, the NFC module 1328, or the MST module 1326 may be included in one integrated chip (IC) or one IC package.

The RF module 1329 may transmit and receive, for example, a communication signal (e.g., an RF signal). Though not shown, the RF module 1329 may include, for example, a transceiver, a power amplifier module (PAM), a frequency filter, or a low noise amplifier (LNA), or an antenna, and the like. According to another embodiment, at least one of the cellular module 1321, the Wi-Fi module 1323, the BT module 1325, the GPS module 1327, the NFC module 1328, or the MST module 1326 may transmit and receive an RF signal through a separate RF module.

The SIM 1324 may include, for example, a card which includes a SIM and/or an embedded SIM. The SIM 1324 may include unique identification information (e.g., an integrated circuit card identifier (ICCID)) or subscriber information (e.g., an international mobile subscriber identity (IMSI)).

The memory 1330 (e.g., a memory 1230 of FIG. 12) may include, for example, an embedded memory 1332 or an external memory 1334. The embedded memory 1332 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1334 may include a flash drive, for example, a compact flash (CF), a secure digital (SD), a micro-SD, a mini-SD, an extreme digital (xD), a multimedia card (MMC), or a memory stick, and the like. The external memory 1334 may operatively and/or physically connect with the electronic device 1301 through various interfaces.

The secure module 1336 may be a module which has a relatively higher secure level than the memory 1330 and may be a circuit which stores secure data and guarantees a protected execution environment. The secure module 1336 may be implemented with a separate circuit and may include a separate processor. The secure module 1336 may include, for example, an embedded secure element (eSE) which is present in a removable smart chip or a removable SD card or is embedded in a fixed chip of the electronic device 1301. Also, the secure module 1336 may be driven by an OS different from the OS of the electronic device 1301. For example, the secure module 1336 may operate based on a java card open platform (JCOP) OS.

The sensor module 1340 may measure, for example, a physical quantity or may detect an operation state of the electronic device 1301, and may convert the measured or detected information to an electric signal. The sensor module 1340 may include at least one of, for example, a gesture sensor 1340A, a gyro sensor 1340B, a barometer sensor 1340C, a magnetic sensor 1340D, an acceleration sensor 1340E, a grip sensor 1340F, a proximity sensor 1340G, a color sensor 1340H (e.g., red, green, blue (RGB) sensor), a biometric sensor 1340I, a temperature/humidity sensor 1340J, an illumination sensor 1340K, or an ultraviolet (UV) sensor 1340M. Additionally or alternatively, the sensor module 1340 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1340 may further include a control circuit for controlling at least one or more sensors included therein. According to various embodiments, the electronic device 1301 may further include a processor configured to control the sensor module 1340, as part of the processor 1310 or to be independent of the processor 1310. While the processor 1310 is in a sleep state, the electronic device 1301 may control the sensor module 1340.

The input device 1350 may include, for example, a touch panel 1352, a (digital) pen sensor 1354, a key 1356, or an ultrasonic input device 1358. The touch panel 1352 may use at least one of, for example, a capacitive type, a resistive type, an infrared type, or an ultrasonic type. Also, the touch panel 1352 may further include a control circuit. The touch panel 1352 may further include a tactile layer and may provide a tactile reaction to a user.

The (digital) pen sensor 1354 may be, for example, part of the touch panel 1352 or may include a separate sheet for recognition. The key 1356 may include, for example, a physical button, an optical key, or a keypad. The ultrasonic input device 1358 may allow the electronic device 1301 to detect a sound wave using a microphone (e.g., a microphone 1388) and to verify data through an input tool generating an ultrasonic signal.

The display 1360 (e.g., a display 1260 of FIG. 12) may include a panel 1362, a hologram device 1364, or a projector 1366. The panel 1362 may include the same or similar configuration to the display 160 or 1260. The panel 1362 may be implemented to be, for example, flexible, transparent, or wearable. The panel 1362 and the touch panel 1352 may be integrated into one module. The hologram device 1364 may show a stereoscopic image in a space using interference of light. The projector 1366 may project light onto a screen to display an image. The screen may be positioned, for example, inside or outside the electronic device 1301. According to an embodiment, the display 1360 may further include a control circuit for controlling the panel 1362, the hologram device 1364, or the projector 1366.

The interface 1370 may include, for example, a high-definition multimedia interface (HDMI) 1372, a universal serial bus (USB) 1374, an optical interface 1376, or a D-subminiature 1378. The interface 1370 may be included in, for example, a communication interface 170 or 1270 shown in FIG. 2 or 12. Additionally or alternatively, the interface 1370 may include, for example, a mobile high definition link (MHL) interface, an SD card/multimedia card (MMC) interface, or an infrared data association (IrDA) standard interface.

The audio module 1380 may convert a sound and an electric signal in dual directions. At least part of components of the audio module 1380 may be included in, for example, an input and output interface 1250 (or a user interface) shown in FIG. 12. The audio module 1380 may process sound information input or output through, for example, a speaker 1382, a receiver 1384, an earphone 1386, or the microphone 1388, and the like.

The camera module 1391 may be a device which captures a still image and a moving image. According to an embodiment, the camera module 1391 may include one or more image sensors (not shown) (e.g., a front sensor or a rear sensor), a lens (not shown), an image signal processor (ISP) (not shown), or a flash (not shown) (e.g., an LED or a xenon lamp).

The power management module 1395 may manage, for example, power of the electronic device 1301. According to an embodiment, though not shown, the power management module 1395 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 1396 and voltage, current, or temperature thereof while the battery 1396 is charged. The battery 1396 may include, for example, a rechargeable battery or a solar battery.

The indicator 1397 may display a specific state of the electronic device 1301 or part (e.g., the processor 1310) thereof, for example, a booting state, a message state, or a charging state, and the like. The motor 1398 may convert an electric signal into mechanical vibration and may generate vibration or a haptic effect, and the like. Though not shown, the electronic device 1301 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor, one or more processors may perform functions corresponding to the instructions. The computer-readable storage media may be, for example, a memory.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random-access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

Embodiments of the present disclosure described and shown in the drawings are provided as examples to describe technical content and help understanding but do not limit the present disclosure. Accordingly, it should be interpreted that besides the embodiments listed herein, all modifications or modified forms derived based on the technical ideas of the present disclosure are included in the present disclosure as defined in the claims, and their equivalents.

The above-described embodiments of the present disclosure can be implemented in hardware, firmware or via the execution of software or computer code that can be stored in a recording medium such as a CD ROM, a DVD, a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., Advanced RISC Machines (ARM)-based processors), a digital signal processor (DSP), a programmable logic device (PLD), an application-specific integrated circuit (ASIC), a Field-Programmable Gate Array (FPGA), a Graphical Processing Unit (GPU), a video card controller, etc. In addition, it would be recognized that when a general-purpose computer accesses code for implementing the processing shown herein, the execution of the code transforms the general-purpose computer into a special purpose computer for executing the processing shown herein. Any of the functions and operations provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a first camera device;
   a second camera device; and
   at least one processor operatively connected to the first camera device and the second camera device,
   wherein the at least one processor is configured to:
      when an execution of an iris recognition function is requested, obtain a first image associated with a subject from the first camera device,
      output information about a feature point of the obtained first image on a display, and
      in response to the information about the feature point satisfies a specified condition, obtain a second image associated with the subject from the second camera device, and
   wherein a display location of the information about the feature point on the display is changed based on a capture angle of the first camera device for the subject.

2. The electronic device of claim 1, wherein the at least one processor is further configured to:
   determine whether the subject is a human's face in the first image,
   when the subject is the human's face, extract a feature point of the human's face or extract a feature point of an eye area included in the human's face, and
   determine whether information associated with the extracted feature point of the human's face or the extracted feature point of the eye area satisfies the specified condition.

3. The electronic device of claim 1, wherein the at least one processor is further configured to:
   determine whether the feature point is adjacent to a specified location of the display or at least a portion of the feature point overlaps the specified location.

4. The electronic device of claim 3, wherein the at least one processor is further configured to:
   output at least one of an indicator object corresponding to the feature point or a target location object, at which the indicator object needs to be located, on the display.

5. The electronic device of claim 4, wherein the at least one processor is further configured to:
   when at least a portion of the indicator object overlaps the target location object, obtain the second image based on the second camera device.

6. The electronic device of claim 1, wherein the at least one processor is further configured to:
   activate the first camera device and the second camera device before obtaining the first image corresponding to a request of the execution of the iris recognition function.

7. The electronic device of claim 6, wherein the at least one processor is further configured to:
   when the specified condition is satisfied, activate a light emitter configured to emit light of a frequency band associated with image capture of the second camera device.

8. The electronic device of claim 1,
   wherein the at least one processor is further configured to deactivate a camera and a light emitter associated with the second camera device, and
   wherein the at least one processor is further configured to:
      deactivate the camera and the light emitter associated with the second camera device when the first camera device is activated, and
      when the specified condition is satisfied, activate the camera and the light emitter of the second camera device.

9. The electronic device of claim 1, wherein the at least one processor is further configured to:
   detect an eye area of the subject, and
   map and output a feature point corresponding to the eye area to eye area information of an image stored in a memory.

10. The electronic device of claim 9, wherein the at least one processor is further configured to:
    adjust at least one of a display size, a display location, or a display direction of the image in response to a change in a size or a location of the feature point corresponding to the eye area.

11. A method for operating an iris recognition function, the method comprising:
    receiving a request for execution of an iris recognition function;
    obtaining a first image of a subject from a first camera device;
    outputting information about a feature point of the obtained first image on a display; and
    in response to the information of the feature point satisfies a specified condition, obtaining a second image associated with the subject from a second camera device different from the first camera device; and
    changing a display location of the information about the feature point on the display based on a capture angle of the first camera device for the subject.

12. The method of claim 11, wherein the obtaining of the second image includes:
    determining whether the subject is a human's face in the first image;
    when the subject is the human's face, extracting a feature point of the human's face or extracting a feature point of an eye area included in the human's face, and determining whether information associated with the extracted feature point of the human's face or the extracted feature point of the eye area satisfies the specified condition.

13. The method of claim 11, wherein the obtaining of the second image includes:
determining whether the feature point is adjacent to a specified location of the display or at least portion of the feature point overlaps the specified location.

14. The method of claim 13, wherein the obtaining of the second image includes:
outputting at least one of an indicator object corresponding to the feature point or a target location object, at which the indicator object needs to be located, on the display.

15. The method of claim 14, wherein the obtaining of the second image includes:
when at least a portion of the indicator object overlaps the target location object, obtaining the second image based on the second camera device.

16. The method of claim 11, further comprising:
activating the first camera device and the second camera device before obtaining the first image corresponding to a request of the execution of the iris recognition function.

17. The method of claim 16, wherein the obtaining of the second image includes:
when the specified condition is satisfied, activating a light emitter configured to emit light of a frequency band associated with image capture of the second camera device.

18. The method of claim 11, further comprising:
deactivating a camera and a light emitter associated with the second camera device, when the first camera device is activated,
wherein, when the specified condition is satisfied, the obtaining of the second image includes activating the light emitter and the camera associated with the second camera device.

19. The method of claim 11, wherein the outputting of the information about the feature point of the obtained first image in the display includes:
detecting an eye area of the subject; and
mapping and outputting a feature point corresponding to the eye area to eye area information of an image stored in a memory.

20. The method of claim 19, wherein the outputting of the information about the feature point of the obtained first image in the display includes:
adjusting at least one of a display size, a display location, or a display direction of the image in response to a change in a display size or a display location of the feature point corresponding to the eye area.

* * * * *